United States Patent
Kobayashi et al.

(10) Patent No.: US 9,756,272 B2
(45) Date of Patent: Sep. 5, 2017

(54) IMAGE PICKUP APPARATUS, IMAGE PICKUP SYSTEM, AND METHOD OF DRIVING IMAGE PICKUP APPARATUS

(71) Applicant: CANON KABUSHIKI KAISHA, Tokyo (JP)

(72) Inventors: Daisuke Kobayashi, Kawaguchi (JP); Tomoya Onishi, Ayase (JP); Takeru Ohya, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 10 days.

(21) Appl. No.: 14/258,754

(22) Filed: Apr. 22, 2014

(65) Prior Publication Data

US 2014/0320712 A1    Oct. 30, 2014

(30) Foreign Application Priority Data

Apr. 24, 2013  (JP) ................................ 2013-091426

(51) Int. Cl.
*H04N 5/3745* (2011.01)
(52) U.S. Cl.
CPC ............................. *H04N 5/37455* (2013.01)
(58) Field of Classification Search
CPC .................................................. H04N 5/37455
See application file for complete search history.

(56) References Cited

U.S. PATENT DOCUMENTS

| | | | | |
|---|---|---|---|---|
| 5,801,657 A * | 9/1998 | Fowler | ................ | H03M 1/123 341/155 |
| 6,580,454 B1 * | 6/2003 | Perner | ............... | H01L 27/14643 257/E27.133 |
| 2002/0176067 A1 * | 11/2002 | Charbon | ................ | G01S 7/487 356/4.01 |
| 2006/0023109 A1 * | 2/2006 | Mabuchi | ................ | H01L 24/17 348/340 |
| 2007/0216790 A1 * | 9/2007 | Kok | ................ | H04N 5/37457 348/308 |
| 2010/0302407 A1 | 12/2010 | Ayers | | |
| 2011/0205100 A1 * | 8/2011 | Bogaerts | ............... | H04N 5/3575 341/169 |
| 2011/0291019 A1 * | 12/2011 | Yuan | ...................... | G01T 1/247 250/370.09 |
| 2012/0307120 A1 * | 12/2012 | Ito | .......................... | H04N 5/341 348/302 |
| 2012/0320246 A1 * | 12/2012 | Ikuma | ................ | H04N 5/3575 348/300 |

FOREIGN PATENT DOCUMENTS

| | | |
|---|---|---|
| JP | 2004-193675 A | 7/2004 |
| JP | P2006-287879 A | 10/2006 |
| JP | P2009-049740 A | 3/2009 |
| JP | 2010-245955 A | 10/2010 |
| JP | 2011-071958 A | 4/2011 |
| JP | 2011-082330 A | 4/2011 |
| JP | P2012-099910 A | 5/2012 |
| JP | 2013-070364 A | 4/2013 |

* cited by examiner

*Primary Examiner* — Albert Cutler
(74) *Attorney, Agent, or Firm* — Canon USA, Inc. IP Division

(57) ABSTRACT

In an image pickup apparatus including first circuits, second circuits, and conversion units, an operation period of the second circuit is shorter than an operation period of the first circuit, and a number of the first circuit arranged in each unit cell is greater than a number of the second circuit arranged in each unit cell.

11 Claims, 18 Drawing Sheets

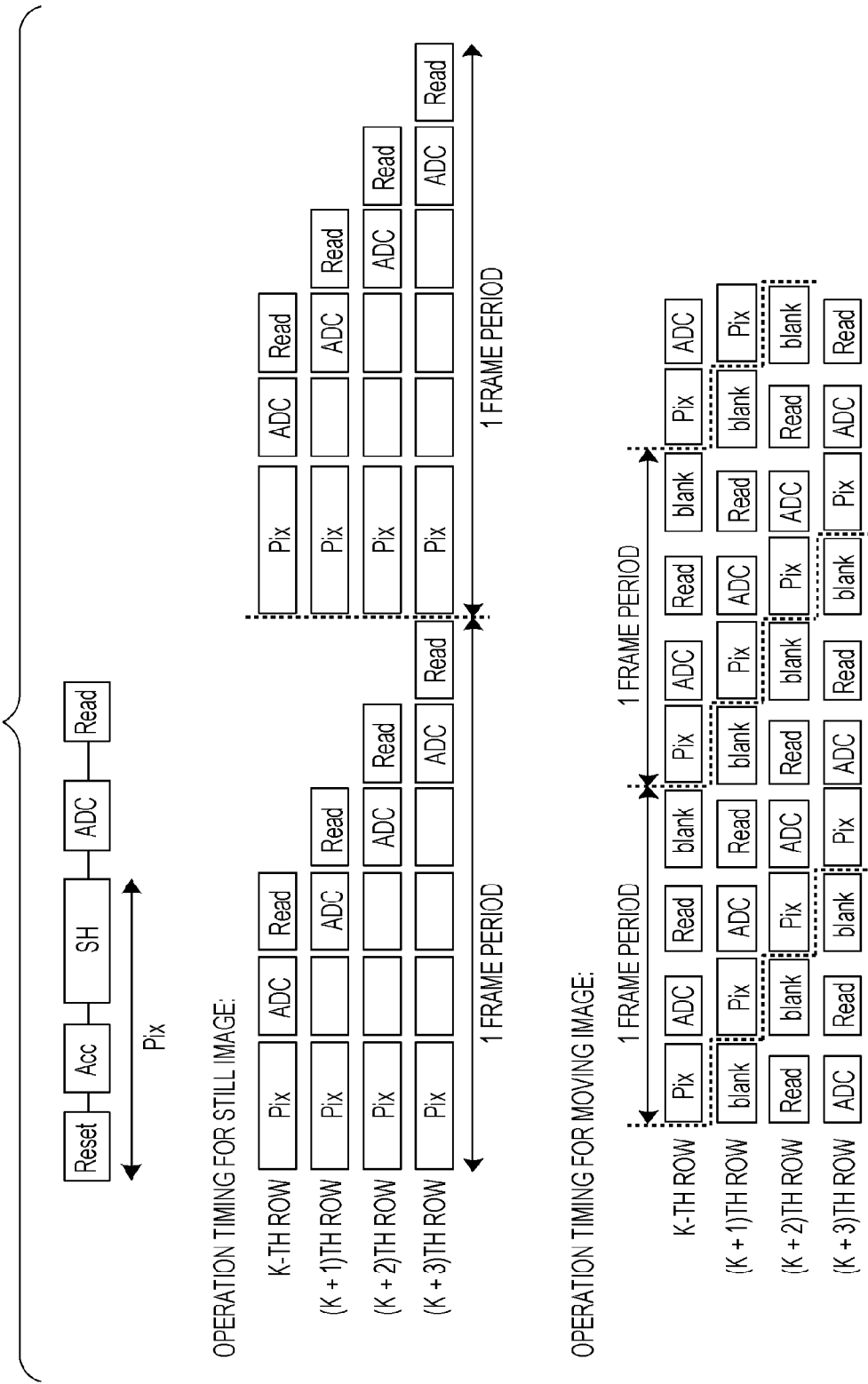

READOUT OF K-TH ROW:

L-TH COLUM (L + 1)TH COLUMN

READOUT OF (K + 1)TH ROW:

L-TH COLUM (L + 1)TH COLUMN

READOUT OF (K + 2)TH ROW:

L-TH COLUM (L + 1)TH COLUMN

READOUT OF (K + 3)TH ROW:

L-TH COLUM (L + 1)TH COLUMN

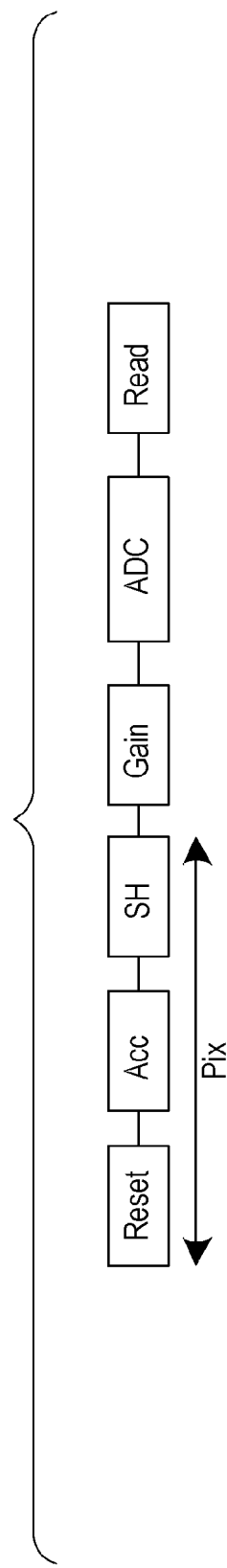

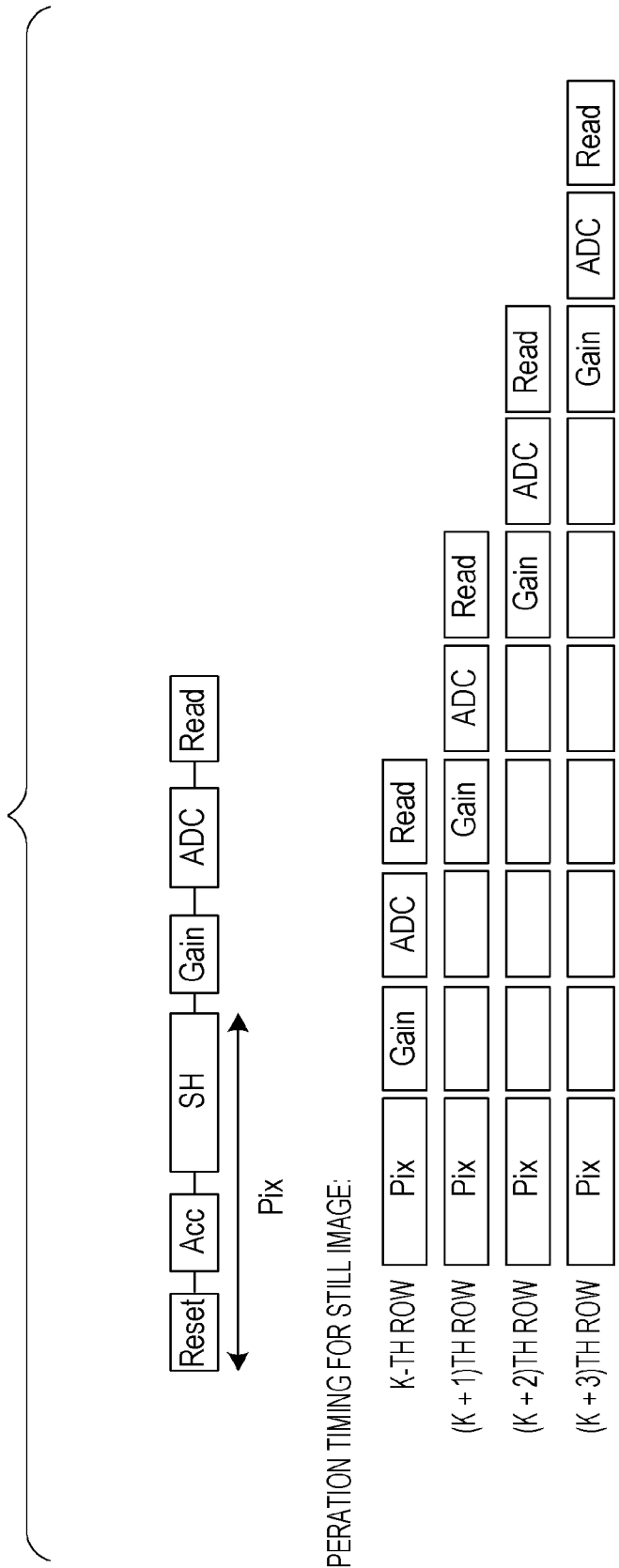

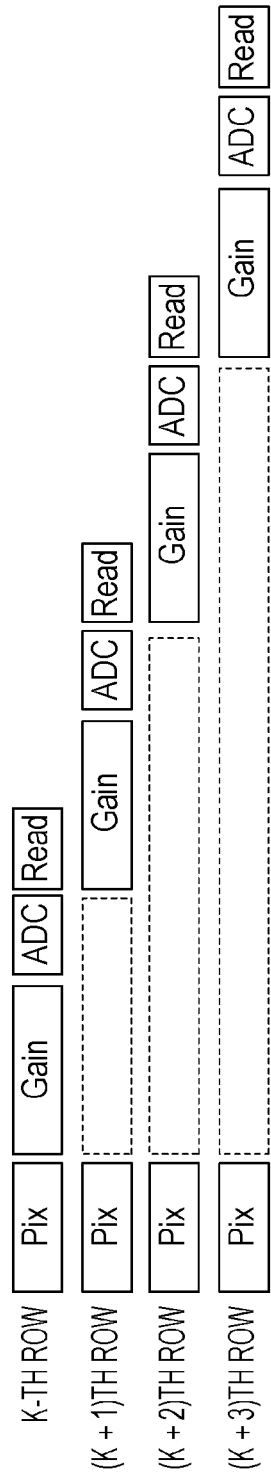

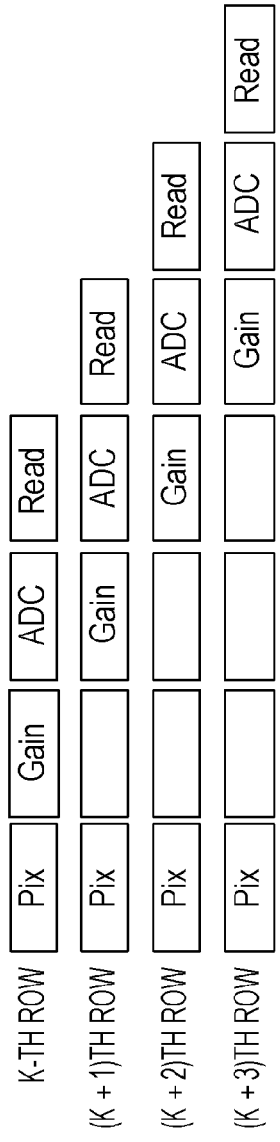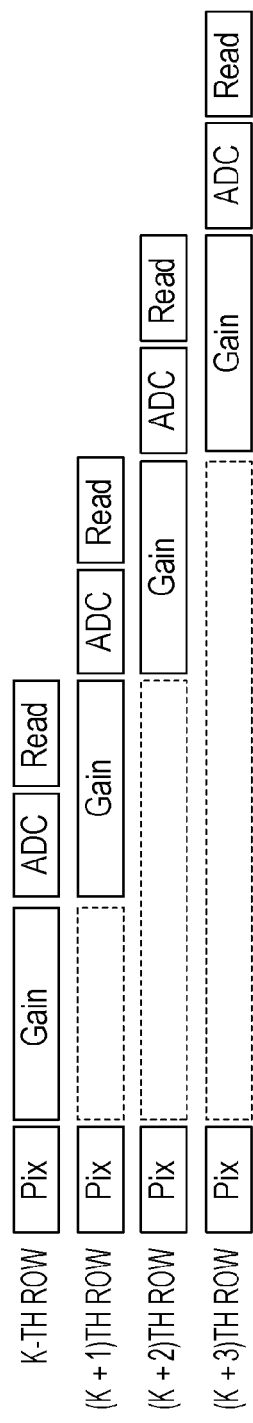

OPERATION TIMING FOR STILL IMAGE:

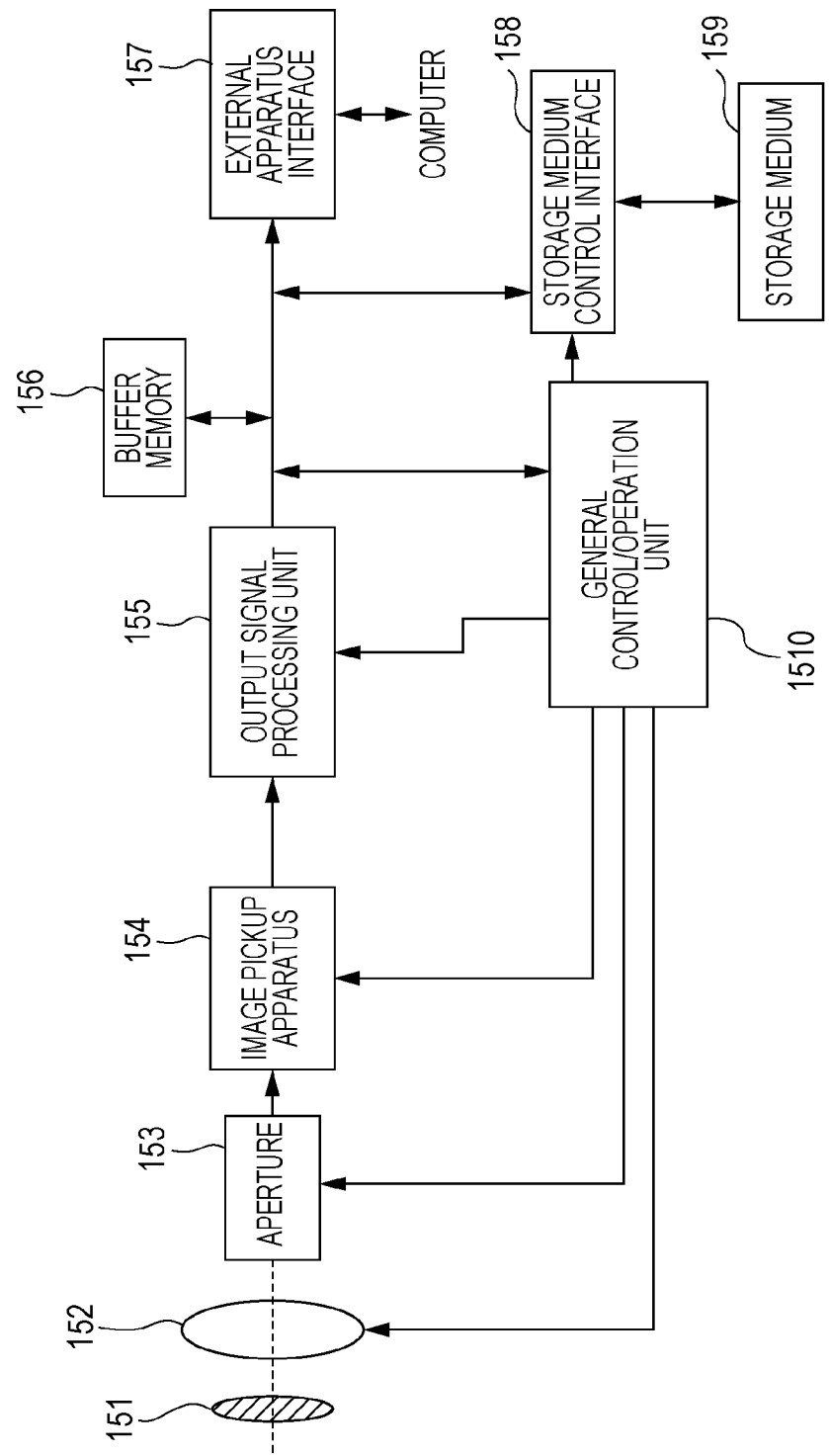

IMAGE PICKUP APPARATUS, IMAGE PICKUP SYSTEM, AND METHOD OF DRIVING IMAGE PICKUP APPARATUS

BACKGROUND

Field

The present subject matter relates to an image pickup apparatus configured to convert an incident electromagnetic wave into an electric signal, an image pickup system, and a method of driving an image pickup apparatus.

Description of Related Art

An image pickup apparatus is known that includes a conversion unit configured to convert an incident electromagnetic wave into an electric signal. Japanese Laid-Open Patent Application No. 2006-287879 discloses an example of such an image pickup apparatus in which an analog-to-digital conversion unit (hereinafter referred to as an ADC unit) is provided for each subarray including a plurality of conversion units each configured to generate an electric signal based on incident light. The ADC unit provided for each subarray sequentially converts signals output from the plurality of conversion units in the subarray into digital signals and outputs the resultant digital signals to the outside of the subarray.

In some cases, in a subarray, a signal based on an electric signal is processed by one of a first circuit and a second circuit, and the resultant signal is then processed by the other one of the first circuit and the second circuit. However, Japanese Laid-Open Patent Application No. 2006-287879 does not disclose any technique to optimize the number of conversion units sharing the first circuit and the number of conversion units sharing the second circuit depending on a difference in operation period between the first circuit and the second circuit.

SUMMARY

An image pickup apparatus includes a pixel array including a plurality of unit cells, and a vertical output line configured to output a signal output from each of the unit cells to the outside of the pixel array, each unit cell outputting a digital signal based on the electric signal, and each unit cell including a plurality of conversion units configured to output electric signals based on electromagnetic waves incident on the respective ones of the plurality of conversion units, and a first circuit and a second circuit configured to process signals based on the electric signals, wherein the first circuit and the second circuit are configured such that one of the first circuit and the second circuit processes a signal processed by the other one of the first circuit and the second circuit, wherein an operation period of the second circuit is shorter than an operation period of the first circuit, and wherein a number of the first circuit arranged in each unit cell being greater than a number of the second circuit arranged in each unit cell.

An image pickup system according to an embodiment includes the image pickup apparatus according to the previous embodiment, and an output signal processing unit configured to generate an image by processing a signal output from the image pickup apparatus.

An embodiment provides a method of driving an image pickup apparatus according to the previous embodiment, the method including performing a first process by the first circuit to process a signal based on the electric signal of a first one of the plurality of conversion units, performing a second process by the second circuit to process a signal based on the electric signal of the first one of the plurality of conversion units, and performing a third process by the first circuit to process an electric signal based on the electric signal of a second one of the plurality of conversion units, wherein there is an overlap between at least part of a period in which the second process is performed and at least part of a period in which the third process is performed.

Further features of the present subject matter will become apparent from the following description of exemplary embodiments with reference to the attached drawings.

BRIEF DESCRIPTION OF THE DRAWINGS

FIG. 3A is a diagram illustrating an example of an operation of a pixel output circuit and a comparator unit.

FIG. 5B is a diagram illustrating another example of an operation of a pixel output circuit and a comparator unit.

FIG. 6B is a diagram illustrating another example of an operation of a pixel output circuit and a comparator unit.

FIG. 7C is a diagram illustrating another example of an operation of a pixel output circuit and a comparator unit.

FIG. 8B is a diagram illustrating another example of an operation of a pixel output circuit and a comparator unit.

FIG. 8C is a diagram illustrating yet another example of an operation of a pixel output circuit and a comparator unit.

FIG. 11 is a diagram illustrating an example of a configuration of an image pickup system.

DETAILED DESCRIPTION

Example embodiments are described below to disclose techniques of optimizing the number of conversion units sharing the first circuit and the number of conversion units sharing the second circuit depending on a difference in operation period between the first circuit and the second circuit.

First Example Embodiment

Figure 1A:
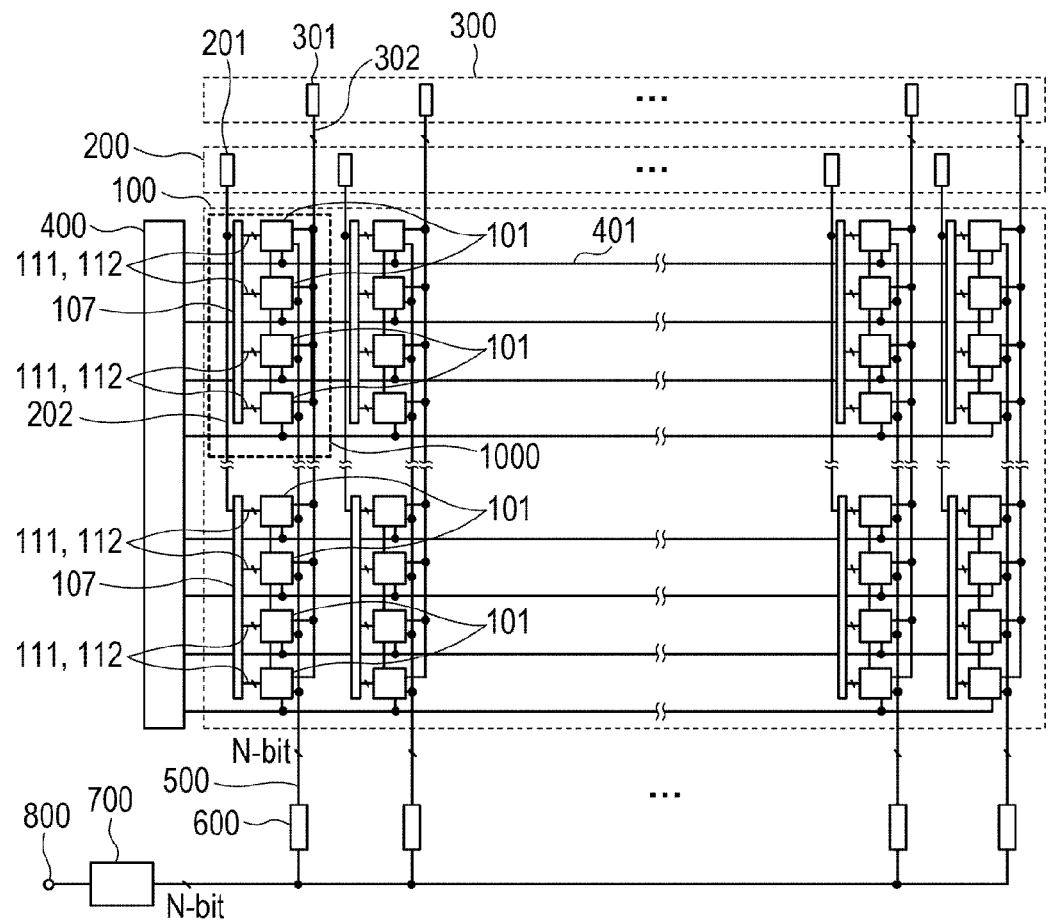
FIG. 1A is a diagram illustrating an example of a configuration of an image pickup apparatus.

FIG. 1A illustrates a configuration of an image pickup apparatus according to a first example embodiment.

In FIG. 1A, a pixel array 100 includes pixel output circuits 101 arranged in a matrix form. Each four pixel output circuits 101 continuously arranged in a vertical direction share one comparator unit 107. Each unit cell 1000 functioning as a subarray according to the present embodiment includes one comparator unit 107 and four pixel output circuits 101 sharing the one comparator unit 107. A driving bias group 200 includes ramp signal supply circuits 201 each configured to supply a ramp signal to a corresponding comparator unit 107.

In the present embodiment, a plurality of ramp signal supply circuits 201 are provided such that each column has its own ramp signal supply circuit 201. Each ramp signal supply circuit 201 supplies a ramp signal to the corresponding comparator unit 107 via a corresponding one of ramp signal lines 202 provided in respective columns. The ramp signal is a reference signal whose electric potential changes with time. A counter group 300 generates a count signal associated with an analog-to-digital conversion operation according to the present embodiment. The analog-to-digital conversion operation will be described in detail later. The counter group 300 includes counter circuits 301 configured to supply count signals to the respective pixel output circuits 101. In the present embodiment, a plurality of counter circuits 301 are provided such that each column has its own counter circuit 301. Each counter circuit 301 supplies an N-bit count signal to the corresponding one of the pixel output circuits 101 via one of count signal lines 302 provided in respective columns. Note that there are as many count signal lines 302 as the bit length N of the count signal. The count signal is a signal generated by the counter circuit 301 by counting a clock signal.

A vertical control circuit 400 controls operations of the pixel output circuits 101 on a row-by-row basis or in units of a plurality of rows.

In the present embodiment, the vertical control circuit 400 controls a photoelectric conversion operation of each pixel output circuit 101, a comparison operation of each comparator unit 107, an operation of storing digital data in a digital memory, an operation of selecting a memory output and reading out data therefrom, and the like. In FIG. 1A, for simplicity, only one line is drown as each control signal line 401 for supplying these control signals, each control signal line 401 may include a plurality of lines depending on the number of lines used to drive respective circuits or a method of selecting pixel output circuits 101.

A pixel output circuit 101 selected by the vertical control circuit 400 transfers the digital signal stored in the digital memory to a digital memory 600 in a corresponding column via a vertical output line 500.

The digital data stored in the digital memory 600 is transferred to an output unit 700. The output unit 700 has a P/S conversion function to convert N-bit parallel data into serial data. The resultant converted data is output from an output terminal 800.

Figure 1B:
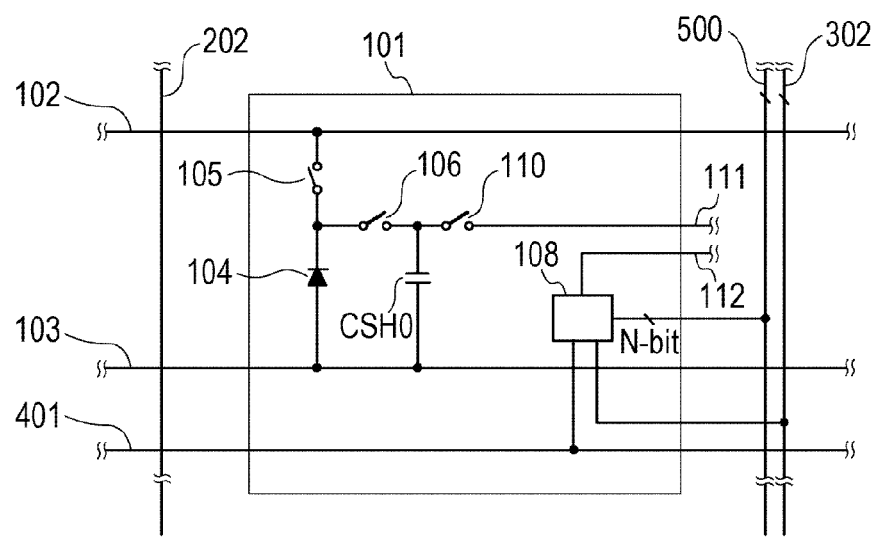
FIG. 1B is a diagram illustrating an example of a configuration of a pixel output circuit.

FIG. 1B is a diagram illustrating a configuration of the pixel output circuit 101 according to the present embodiment.

In the pixel output circuit 101 illustrated in FIG. 1B, a photoelectric conversion unit 104 generates an electric signal based on incident light. The electric signal generated by the photoelectric conversion unit 104 is held by a capacitor element CSH0 via a switch 106. In the present embodiment, the capacitor element CSH0 functions as a signal holding unit that holds the electric signal. The photoelectric conversion unit 104 according to the present embodiment is an example of a conversion unit configured to generate an electric signal based on an incident electromagnetic wave. Hereinafter, the electric signal held by the capacitor element CSH0 will be referred to as a photoelectric conversion signal. By turning the switches 105 and 106 into the conductive state, the signals on the photoelectric conversion unit 104 and the capacitor element CSH0 are reset. By turning the switch 110 into the conductive state, the photoelectric conversion signals generated by respective ones of the four pixel output circuits 101 are sequentially input via a signal output line 111 to the comparator unit 107 exposed outside the pixel output circuit 101. The comparator unit 107 compares the input photoelectric conversion signal with the ramp signal, and outputs, via a latch signal line 112, a latch signal based on a comparison result to a memory 108 in the pixel output circuit 101 from which the photoelectric conversion signal was output. The memory 108 stores the count signal at a moment when a change occurs in the signal value of the latch signal. The count signal stored in the memory 108 is the digital signal based on the photoelectric conversion signal. The memory 108 of the pixel output circuit 101 stores the digital signal based on the signal generated by the photoelectric conversion unit 104 of the pixel output circuit 101. A bias line 103 is a driving bias line for supplying an electric potential to the photoelectric conversion unit 104 and the capacitor element CSH0. When the signal level of the control signal line 401 is turned to a high level by the vertical control circuit 400, the memory 108 outputs the digital signal to the vertical output line 500. In the image pickup apparatus according to the present embodiment, one comparator unit 107 is shared by capacitor elements CSH0 of respective four pixel output circuits 101.

Figure 2A:
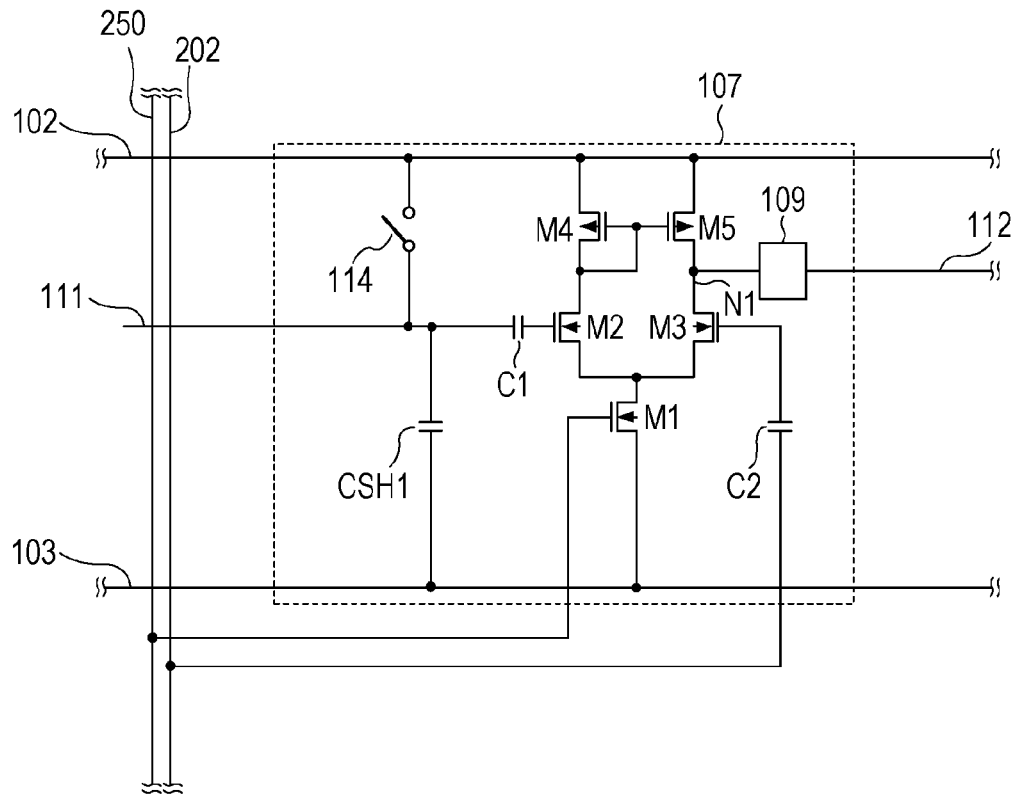
FIG. 2A is a diagram illustrating an example of a configuration of a comparator unit.

Referring to FIG. 2A, a configuration of the comparator unit 107 is described. A bias line 102 supplies a power supply voltage VDD. A bias line 103 supplies a ground potential to a transistor M1. A bias line 250 supplies an electric potential to a control node of the transistor M1. The transistor M1 operates as a current source using the electric potentials given via the bias lines 103 and 250.

A capacitor element CSH1 holds the photoelectric conversion signal input from the pixel output circuit 101 via the signal output line 111. The photoelectric conversion signal held in the capacitor element CSH1 is given to a control node of a transistor M2 via a capacitor element C1. A ramp signal is given to a control node of a transistor M3 from a ramp signal line 202 via a capacitor element C2. A comparison result signal indicating a result of comparison between the electric potential of the control node of the transistor M2 and that of the transistor M3 is output to a latch unit 109 from a node N1. Based on a change in a signal value of the comparison result signal, the latch unit 109 changes a signal value of the latch signal output to the latch signal line 112. When a switch 114 is turned into the conductive state, the signal of the capacitor element CSH1 is reset.

Figure 2B:
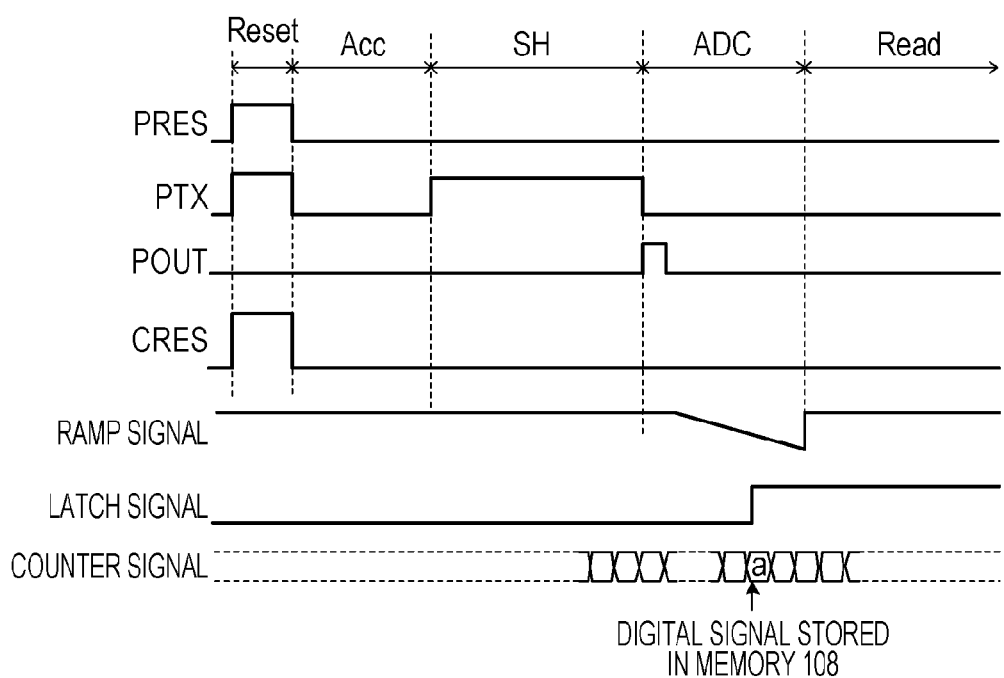
FIG. 2B is a diagram illustrating an example of an operation of a pixel output circuit and a comparator unit.

Next, referring to FIG. 2B, the operation of the image pickup apparatus according to the present embodiment is described. In FIG. 2B, a signal PRES is a signal by which the vertical control circuit 400 controls the switch 105. A signal PTX is a signal by which the vertical control circuit 400 controls the switch 106. A signal POUT is a signal by which the vertical control circuit 400 controls the switch 110. A signal CRES is a signal by which the vertical control circuit 400 controls the switch 114. When the signals PRES, PTX, POUT, and CRES are controlled by the vertical control circuit 400 to be at a high level (hereinafter referred to an H level) by the vertical control circuit 400, the switches controlled by the respective signals are in a conductive state. On the other hand, when the signals PRES, PTX, POUT, and CRES are controlled by the vertical control circuit 400 to be at a low level (hereinafter referred to an L level), the switches controlled by the respective signals are in a non-conductive state.

First, the vertical control circuit 400 turns all signals PRES, PTX, and CRES to the H level. As a result, the signals of the photoelectric conversion unit 104, the capacitor elements CSH0 and CSH1 are reset. During a period in which the PRES is maintained at the H level, the resetting operation is performed. This period is referred to as a reset period, which is denoted by "Reset" in FIG. 2B.

Thereafter, the vertical control circuit 400 turns the signals PRES, PTX, and CRES to the L level. Turning the signals PRES and PTX to the L level causes the photoelectric conversion unit 104 to start accumulating a signal based on the incident light. The photoelectric conversion unit 104 accumulates the signal based on the incident light over a particular period, which is referred to as an accumulation period. In FIG. 2B, this accumulation period is denoted by "Acc".

At the end of the accumulation period, the vertical control circuit 400 turns the signal PTX to the H level. As a result, the signal generated by the photoelectric conversion unit 104 is output to the capacitor element CSH0. The outputting of the signal to the capacitor element CSH0 from the photoelectric conversion unit 104 is performed in a period called an SH period. Note that SH stands for sample hold. In FIG. 2B, the SH period denoted by "SH".

At the end of the SH period, the vertical control circuit 400 turns the signal POUT to the H level. As a result, the photoelectric conversion signal held in the capacitor element CSH0 is input to the comparator unit 107.

Thereafter, the ramp signal supply circuit 201 starts changing the electric potential of the ramp signal. When the relative difference in electric potential between the photoelectric conversion signal and the ramp signal comes to be reversed, the signal value of the latch signal output from the comparator unit 107 changes from the L level to the H level. The memory 108 of the pixel output circuit 101 from which the photoelectric conversion signal was output stores the signal value of the count signal at the point of time at which the signal value of the latch signal changes from the L level to the H level. The memory 108 according to the present embodiment is an example of a second signal holding unit.

Thereafter, the ramp signal supply circuit 201 ends the changing of the electric potential of the ramp signal. A period from the time at which the vertical control circuit 400 turns the signal POUT to the H level to the time at which the ramp signal supply circuit 201 ends the changing of the electric potential is referred to as an ADC period. In FIG. 2B, this ADC period is denoted by "ADC".

Next, the vertical control circuit 400 turns a control signal (not illustrated in the figure) supplied to the control signal line 401 to the H level. As a result, the digital signal stored in the memory 108 is output to the vertical output line 500. This control signal (not illustrated) of the control signal line 401 is maintained at the H level over a period referred to as a readout period. In FIG. 2B, this readout period is denoted by "Read". In the operation illustrated in FIG. 2B, the SH period is longer than the ADC period. The SH period according to the present embodiment is an example of a first period. The ADC period according to the present embodiment is an example of a second period. The comparator unit 107 according to the present embodiment is an example of a signal processing unit.

FIG. 3A illustrates operations of pixel output circuits 101 in four rows and an operation of the comparator unit 107 in terms of operation timings for a still image and a moving image. Note that the pixel output circuits 101 in four rows are the pixel output circuits 101 that share the one comparator unit 107 illustrated in FIG. 1A. In the following description, the four rows associated with these pixel output circuits 101 are denoted by a K-th row, a (K+1)th row, a (K+2)th row, and a (K+3)th row in the order from one located closest to the ramp signal supply circuit 201 and the counter circuit 301 to a farthest one.

In FIG. 3A, a total period including a Reset period, an Acc period, and an SH period is denoted by Pix. Note that the length of the Pix period is greater than that of the ADC period.

First, the operation timings for a still image are described below. In the present embodiment, at the operation timings for the still image, a global shutter operation is performed. That is, the vertical control circuit 400 controls all the pixel output circuits 101 from the K-th row to the (K+3)th row to have the same Pix period. Thereafter, the vertical control circuit 400 starts an ADC period for the pixel output circuit 101 in the K-th row. When the end of the ADC period for the K-th row is reached, the vertical control circuit 400 starts an ADC period for the (K+1)th row. When the vertical control circuit 400 starts the ADC period for the (K+1)th row, the vertical control circuit 400 simultaneously starts a read period for the K-th row. When the end of the ADC period for the (K+2)th row is reached, the vertical control circuit 400 starts an ADC period for the (K+3)th row and a read period for the pixel output circuit 101 in the (K+2)th row. One frame period of the timing operation for the still image is from the start of the Pix period to the end of the read period of the pixel output circuit 101 in the (K+3)th row.

Next, operation timings for a moving image are described below. In FIG. 3A, blank periods are period in which corresponding pixel output circuits 101 are in a waiting state. When the pixel output circuit 101 in the K-th row is in a Pix period, the pixel output circuits 101 in the (K+1)th row, the (K+2)th row, and the (K+3)th row are respectively in a blank period, a read period, and an ADC period. The vertical control circuit 400 provides a Pix period sequentially to the pixel output circuits 101 in the respective rows. As for the ADC period, the read period, and the blank period, the vertical control circuit 400 also gives then sequentially to the pixel output circuits 101 in the respective rows. One frame period for the pixel output circuits 101 in the respective rows, in the timing-related operation associated with the moving image, is from the start of a Pix period to the start of a next Pix period. In the operation timings for the moving image, there is an overlap between an ADC period for a pixel output circuit 101 in a row and an SH period for pixel output circuits 101 in the other rows.

In a first step of the operation timings for the moving image illustrated in FIG. 3A, the signal holding unit of the pixel output circuit 101 in the K-th row holds the photoelectric conversion signal. In a second step, the comparator unit 107 compares the photoelectric conversion signal of the pixel output circuit 101 in the K-th row with the ramp signal. In a third step, the signal holding unit of the pixel output circuit 101 in the (K+1) row holds the photoelectric conversion signal. In the operation timings for the moving image, there is at least a partial overlap between a period of the second step and a period of the third step.

Figure 3B:
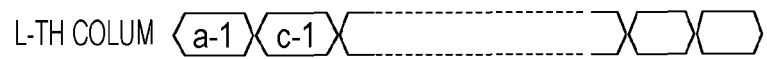
FIG. 3B is a diagram illustrating a digital signal output to a vertical output line.
Figure 3B:
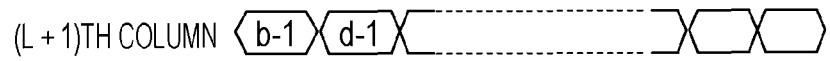
Figure 3B:
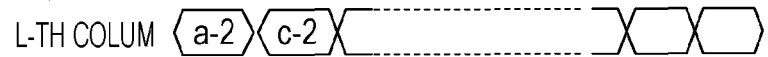
Figure 3B:
Figure 3B:
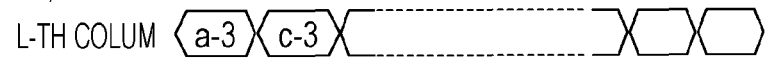
Figure 3B:
Figure 3B:
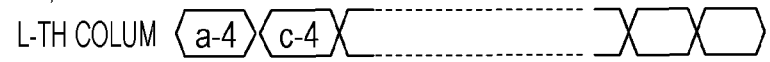
Figure 3B:
Figure 4:
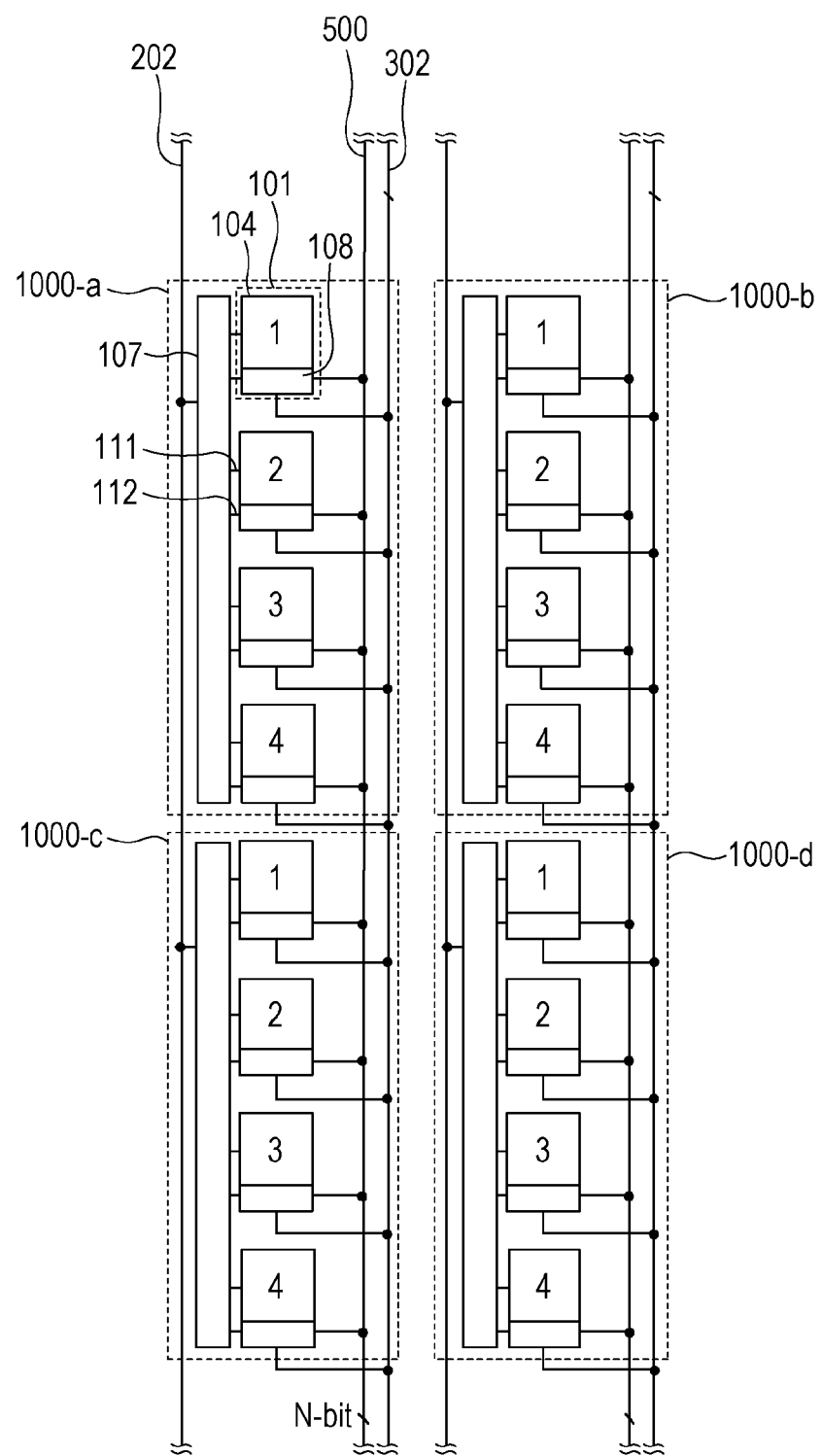
FIG. 4 is a diagram illustrating another example of a configuration of an image pickup apparatus.

FIG. 3B is a diagram illustrating digital signals output to the vertical output line 500. In FIG. 3B, symbols used correspond to a configuration illustrated in FIG. 4. FIG. 4 illustrates pixel output circuits 101 in eight rows and two columns and four comparator units 107. In FIG. 4, each of unit cells 1000-a to 1000-d includes four pixel output circuits 101 and one comparator unit 107. In FIG. 4, numbers from 1 to 4 are assigned to the pixel output circuits 101 in each unit cell 1000 serially in the order from one closest to the ramp signal supply circuit 201 to farthest one. An alphabetic character of each reference symbol in FIG. 3B corresponds to a suffix following reference numeral 1000 assigned to a unit cell, and a number given as a suffix in each reference symbol in FIG. 3B corresponds to a number assigned to a pixel output circuit 101 in each unit cell 1000. For example, a-1 denotes a digital signal associated with a pixel output circuit 101 labeled "1" in a unit cell 1000-a. In FIG. 3B, "k-th row" corresponds to a pixel output circuit 101 labeled "1" in each unit cell 1000 in FIG. 4. In FIG. 3B, "L-th column" corresponds to a column including unit cells 1000-a and 1000-c in FIG. 4. In FIG. 3B, "(L+1)th column" corresponds to a column including unit cells 1000-b and 1000-d in FIG. 4. The vertical output line 500 receives digital signals that are output from the pixel output circuits 101 in the k-th row of unit cells 1000 sequentially from one unit cell to another. Similarly, digital signals are output to the vertical output line 500, sequentially from one unit cell 1000 to another, from the pixel output circuits 101 in the (K+1)th row, the (K+2)th row, and the (K+3)th row.

In the present embodiment, by way of example, the capacitor elements CSH0 of each respective four pixel output circuits 101 share one comparator unit 107. In the image pickup apparatus according to the present embodiment, as described above with reference to FIG. 2B and FIG. 3A, the SH period is longer than the ADC period.

Because the SH period is longer than the ADC period, the image pickup apparatus according to the present embodiment is configured such that each pixel output circuit 101 has its own capacitor element CSH0 and one comparator unit 107 is shared by a plurality of pixel output circuits 101. This configuration of the image pickup apparatus according to the present embodiment allows a reduction in the length of one frame period compared with a configuration in which each pixel output circuit 101 has its own comparator unit 107 and a capacitor element CSH0 whose operation period is longer than that of the comparator unit 107 is shared by a plurality of pixel output circuits 101. That is, in the image pickup apparatus according to the present embodiment, the number of pixel output circuits 101 sharing a circuit unit with a long operation period is set to be smaller than the number of pixel output circuits 101 sharing a circuit unit with a short operation period. By configuring the image pickup apparatus in this manner according to the present embodiment, it is possible to reduce the number of comparator unites 107 than the number of comparator unites 107 used in the configuration in which each pixel output circuit 101 has its own comparator unit 107. Thus, in the image pickup apparatus according to the present embodiment, the reduction in the number of comparator unites 107 allows a reduction in the circuit area size of the unit cell 1000 illustrated in FIG. 4. Furthermore, in the image pickup apparatus according to the present embodiment, the reduction in the number of comparator units 107 allows a reduction in power consumption. More specifically, the reduction in the number of comparator units 107 makes it possible to reduce a current flowing through the transistor M1 during periods other than the ADC period. That is, in the image pickup apparatus according to the present embodiment, the reduction in the number of comparator units 107 allows a reduction in power consumption and a reduction in circuit area size while suppressing an increase in operation period compared with the configuration in which each pixel output circuit 101 has its own comparator unit 107.

In the present embodiment, by way of example but not limitation, the potential of the ramp signal used as a reference signal changes in a slope shape. Alternatively, the electric potential of the reference signal may change stepwise. Note that such a reference signal falls within the scope of the reference signal whose electric potential varies with time according to the present embodiment.

In the present embodiment, by way of example, one counter circuit 301 is provided in each column. Alternatively, each pixel output circuit 101 may include its own counter circuit 301.

In the present embodiment, the analog-to-digital conversion is performed, by way of example but not limitation, to compare the photoelectric conversion signal with the ramp signal. Alternatively, the analog-to-digital conversion may be performed using other methods such as a successive-approximation method, a delta sigma method, or the like.

In the operation timings for the moving image illustrated in FIG. 3A, a blank period is provided before each Pix period. Alternatively, no blank period may be provided, and instead, each Pix period may be elongated.

Furthermore, in the present embodiment, by way of example but not limitation, each pixel output circuit 101 has its own memory 108. Alternatively, one memory 108 may be shared by a plurality of pixel output circuits 101 as long as the ADC period is not greater in length than the SH period.

By configuring each comparator unit 107 to have a plurality of memory 108, it is allowed to have an overlap between an ADC period for pixel output circuits 101 in a certain row and a read period for pixel output circuits 101 in another row. This makes it possible to reduce a period in which a digital signal is obtained from pixel output circuits 101 in a plurality of rows compared with a configuration in which each comparator unit 107 has one memory 108.

The photoelectric conversion unit 104 is an example of a conversion unit configured to generate an electric signal based on an incident electromagnetic wave. Alternatively, the conversion unit that generates an electric signal based on an incident electromagnetic wave may be configured to generate an electric signal based on other types of incident electromagnetic waves such as an X-ray, an infrared ray, or the like.

Second Example Embodiment

An image pickup apparatus according to a second example embodiment is described below with a focus on differences from the first example embodiment.

Figure 5A:
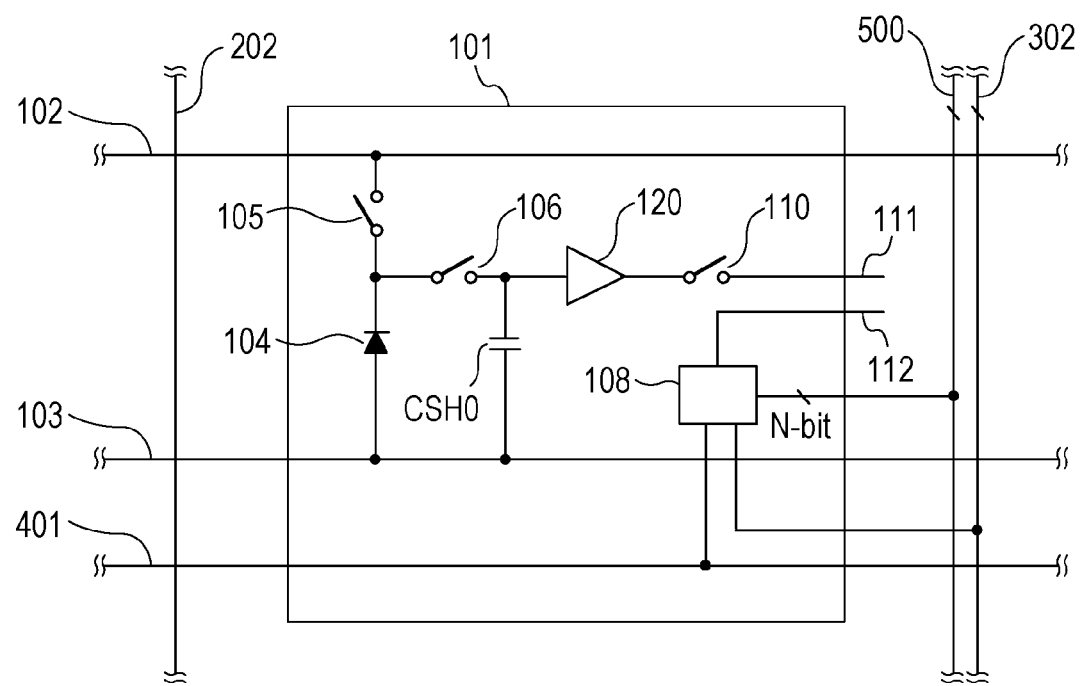
FIG. 5A illustrates another example of a configuration of a pixel output circuit.

FIG. 5A is a diagram illustrating a configuration of a pixel output circuit 101 according to the present embodiment. A difference from the configuration illustrated in FIG. 1B is that each pixel output circuit 101 additionally includes an amplifier 120. The amplifier 120 of each pixel output circuit 101 according to the present embodiment is an example of a first circuit. The comparator unit 107 according to the present embodiment is an example of a second circuit.

When a switch 106 is turned into the conductive state, a photoelectric conversion signal is input to the amplifier 120. The amplifier 120 amplifies the input photoelectric conversion signal and outputs the resultant amplified photoelectric conversion signal to the comparator unit 107 via a signal output line 111.

FIG. 5B illustrates operation timings according to the present embodiment. A difference from FIG. 3A is that a gain period is added as a period in which the amplifier 120 performs an operation of amplifying the photoelectric conversion signal. Although each gain period is illustrated in FIG. 5B such that the gain period is separated from a SH period, the SH period actually includes part of the gain period because the amplifier 120 starts the amplification operation at a point of time when the switch 106 is turned into the conductive state. The operation timings for the still image and the operation timings for the moving image in FIG. 5B are similar to those illustrated in FIG. 3A except that gain periods are added.

In a first step of the operation timings for the moving image illustrated in FIG. 5B, the amplifier 120 of the pixel output circuit 101 in the K-th row amplifies the photoelectric conversion signal. In a second step, the comparator unit 107 compares the signal output from the amplifier 120 of the pixel output circuit 101 in the K-th row with the ramp signal. In a third step, the amplifier 120 of the pixel output circuit 101 in the (K+1)th row amplifies the photoelectric conversion signal. In the operation timings for the moving image, there is an overlap between at least a part of a period of the second step and at least a part of a period of the third step.

The gain period may be a period from a time at which the amplifier 120 starts outputting the amplified photoelectric conversion signal to a time at which the output of the amplifier 120 reaches a stable particular output value. In a case where the analog-to-digital conversion is performed with N-bit precision, the particular output value described above is such a value that satisfies a following condition: when the amplitude of the input range of the comparator unit 107 is denoted by VR and the difference between the ideal output value of the amplifier 120 and the actual output value of the amplifier 120 is denoted by DIF, DIF satisfies Equation 1 described below.

$$|DIF| \leq \left|\frac{VR}{2^N}\right|$$ Equation 1

The ideal output value of the amplifier 120 may be calculated using a gain set for the amplifier 120. That is, when an input value given to the amplifier 120 is denoted by A, the set gain is denoted by G, and the ideal output value of the amplifier 120 is denoted by B, B=G×A. The length of the gain period is determined by a circuit configuration of the amplifier 120 and a value of a current that drives the amplifier 120.

Also in the image pickup apparatus according to the present embodiment, when the SH period is set to be longer than the ADC period, it is possible to achieve advantageous effects similar to those achieved by the first embodiment.

In a case where the gain period is longer than the ADC period, by configuring the image pickup apparatus such that each pixel output circuit 101 has its own amplifier 120 and such that one comparator unit 107 is shared by a plurality of pixel output circuits 101, it is possible to achieve following advantageous effects. The configuration of the image pickup apparatus according to the present embodiment allows a reduction in the length of one frame period compared with a configuration in which each pixel output circuit 101 has its own comparator unit 107 and an amplifier 120 whose operation period is longer than that of the comparator unit 107 is shared by a plurality of pixel output circuits 101. That is, the circuit unit whose operation period is short is shared by a plurality of pixel output circuits 101, and the circuit unit whose operation period is long is disposed in each pixel output circuit 101. In this case, the gain period according to the present embodiment is an example of a first period, and the ADC period is an example of a second period. In the present embodiment, even when the signal amplitude of the photoelectric conversion signal is small as is the case with an object has low luminance, amplifying the photoelectric conversion signal by the amplifier 120 makes it possible to properly take an image of the object with a proper signal level.

The amplifier 120 is disposed in an electrical path between the photoelectric conversion unit 104 and the comparator unit 107. Because of this configuration of the image pickup apparatus according to the present embodiment, it is possible to reduce kickback noise output from the comparator unit 107 to the photoelectric conversion unit 104.

Third Example Embodiment

An image pickup apparatus according to a third example embodiment is described below with a focus on differences from the second example embodiment.

Figure 6A:
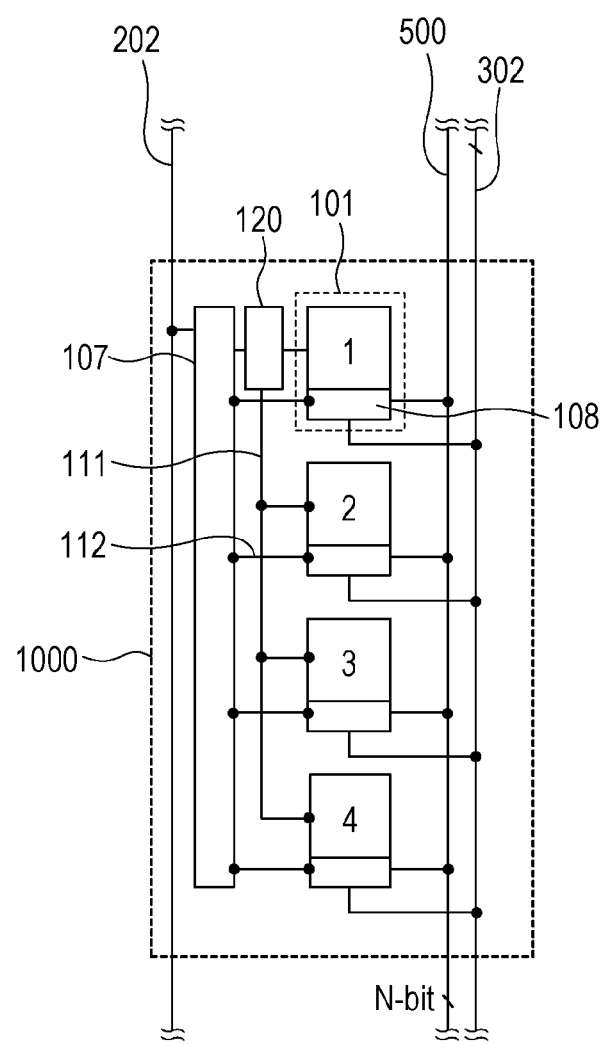
FIG. 6A is a diagram illustrating another example of a configuration of a pixel output circuit.

FIG. 6A illustrates a configuration of the image pickup apparatus according to the third example embodiment. In the image pickup apparatus according to the present embodiment, one amplifier 120 is shared by four pixel output circuits 101. In this configuration, photoelectric conversion signals are output from the four respective pixel output circuits 101 and input to the one amplifier 120 via a signal output line. The amplifier 120 amplifies the photoelectric conversion signals received from the four respective pixel output circuits 101 and outputs the resultant amplified photoelectric conversion signals to the comparator unit 107. The configuration of each pixel output circuit 101 is similar to that illustrated in FIG. 1B, and the configuration of the comparator unit 107 is similar to that illustrated in FIG. 2A. In the present embodiment, the unit cell 1000 includes one comparator unit 107, one amplifier 120, and four pixel output circuits 101 sharing the one amplifier 120.

FIG. 6B illustrates an operation of the image pickup apparatus according to the present embodiment. Also in the present embodiment, the length of one SH period is set to be greater than that of one ADC period. In this configuration, the SH period according to the present embodiment is an example of a first period, and the ADC period according to the present embodiment is an example of a second period. The length of the gain period is equal to that of the ADC period. In FIG. 6B, an operation for the K-th row represents an operation associated with a pixel output circuit 101 labelled "1" in FIG. 6A. Similarly, operations of (K+1)th to (K+3)th rows in FIG. 6B are those associated with pixel output circuits 101 labelled "2" to "4" in FIG. 6A.

The Pix periods for the pixel output circuits 101 in the K-th to (K+3)th are set to be equal to each other. After the end of the Pix period, the vertical control circuit 400 starts a gain period for the pixel output circuit 101 in the K-th row. That is, a photoelectric conversion signal output from the pixel output circuit 101 in the K-th row is input to the amplifier 120. The amplifier 120 amplifies the input photoelectric conversion signal and outputs the resultant amplified signal to the comparator unit 107.

After the end of the gain period, the vertical control circuit 400 starts an ADC period for the pixel output circuit 101 in the K-th row. After the end of the ADC period, the vertical control circuit 400 starts a read period for the pixel output circuit 101 in the K-th row. At the same time, the vertical control circuit 400 starts a gain period for the pixel output circuit 101 in the (K+1)th row. Similarly, in the following operation, when the vertical control circuit 400 starts a read period for a certain row, the vertical control circuit 400 simultaneously starts a gain period in another row.

Also in the present embodiment, because the length of one SH period is set to be greater than that of one ADC period, it is possible to achieve advantageous effects similar to those achieved by the first embodiment. Furthermore, because the amplifier 120 is disposed such that it is shared by a plurality of pixel output circuits 101, the number of amplifiers 120 is reduced, which allows a reduction in power consumption and a reduction in circuit area size compared with the configuration according to the second example embodiment. More specifically, the reduction in the number of amplifiers 120 makes it possible to reduce a current flowing through the amplifier 120 during periods other than the gain period.

In the present embodiment, by way of example, the length of the gain period is set to be equal to that of the ADC period. However, the periods may be set in another manner as described below with reference to FIG. 7A and FIG. 7B.

Figure 7A:
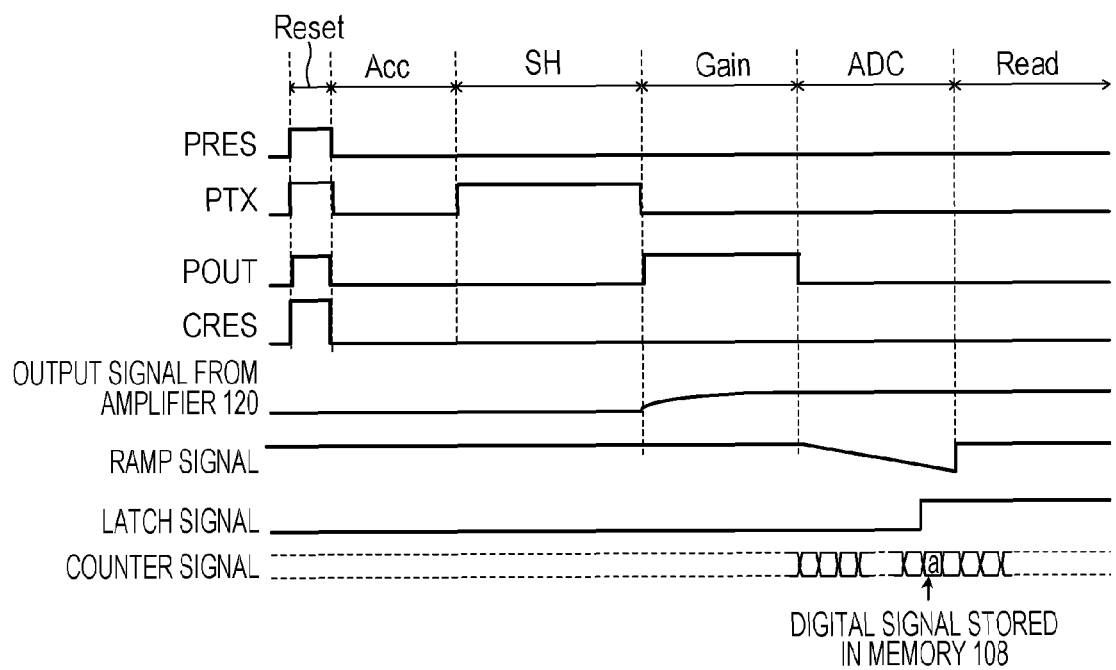
FIG. 7A is a diagram illustrating another example of an operation of a pixel output circuit and a comparator unit.
Figure 7B:
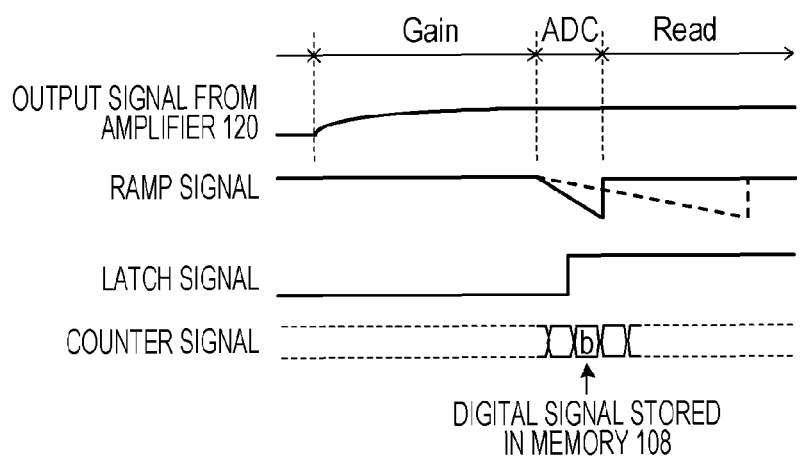
FIG. 7B is a diagram illustrating another example of an operation of a pixel output circuit and a comparator unit.

As in the second example embodiment described above, the gain period is a period from a time at which the amplifier 120 starts outputting the amplified photoelectric conversion signal to a time at which the output of the amplifier 120 reaches a stable particular output value. On the other hand, the ADC period and the read period may be determined based on the resolution of the analog-to-digital conversion and the frequency of the count signal. In the present embodiment, when a fixed frequency of the count signal is given, the resolution of the analog-digital conversion is determined by the number of counts from a start to an end of a change in electric potential of the ramp signal and the magnitude of a change in electric potential of the ramp signal per one count. In the case illustrated in FIG. 7A, when the resolution of the analog-to-digital conversion is N bits, the number of counts during the ADC period is given by $2^N$ where $2^N$ denotes 2 to the N-th power. Hereinafter, symbol ^ is used to denote an exponential value. A change $\Delta V$ in ramp signal per one count is given by $\Delta V = VR/(2^N)$. FIG. 7B illustrates an operation for a case where the resolution is (N−2) bits. The number of counts during the ADC period is given by $2^{(N-2)}$, and the change $\Delta V$ in the ramp signal per count is given by $\Delta V = VR/(2^{(N-2)})$. Thus, the number of counts during the ADC period is ¼ of that in the case where the resolution of the analog-to-digital conversion is N bits. Thus, it is possible to reduce the ADC period by controlling the number of counts and the change of the ramp signal per count. It is also possible to adjust the ADC period, by controlling the frequency of the count signal. As for the read period, the number of pieces of data read out during the read period depends on the resolution, and thus the adjustment may be performed in a similar manner to the ADC period. For example, in a case where the digital signal obtained via the parallel-serial conversion is transmitted via the vertical output line 500, the read period may be reduced by reducing the resolution of the comparator unit 107. FIG. 7C illustrates an example of a timing-related operation for a still image in which the ADC period is adjusted such that the gain period is about 2 times longer than the ADC period. In the example illustrated in FIG. 7C, as a result of a reduction in resolution of the comparator unit 107, the read period becomes approximately equal to the ADC period.

In the present embodiment described above, the amplifier 120 amplifies photoelectric conversion signals of a plurality of pixel output circuits 101 and outputs the resultant amplified signals to the comparator unit 107. Alternatively, an adding function may be provided to the input stage of the amplifier 120 such that a signal obtained by adding the photoelectric conversion signals of the plurality of pixel output circuits 101 may be amplified by the amplifier 120 and output to the comparator unit 107.

Fourth Example Embodiment

An image pickup apparatus according to a fourth example embodiment is described below with a focus on differences from the third example embodiment. The unit cell 1000 has a configuration similar to that illustrated in FIG. 6A.

Figure 8A:
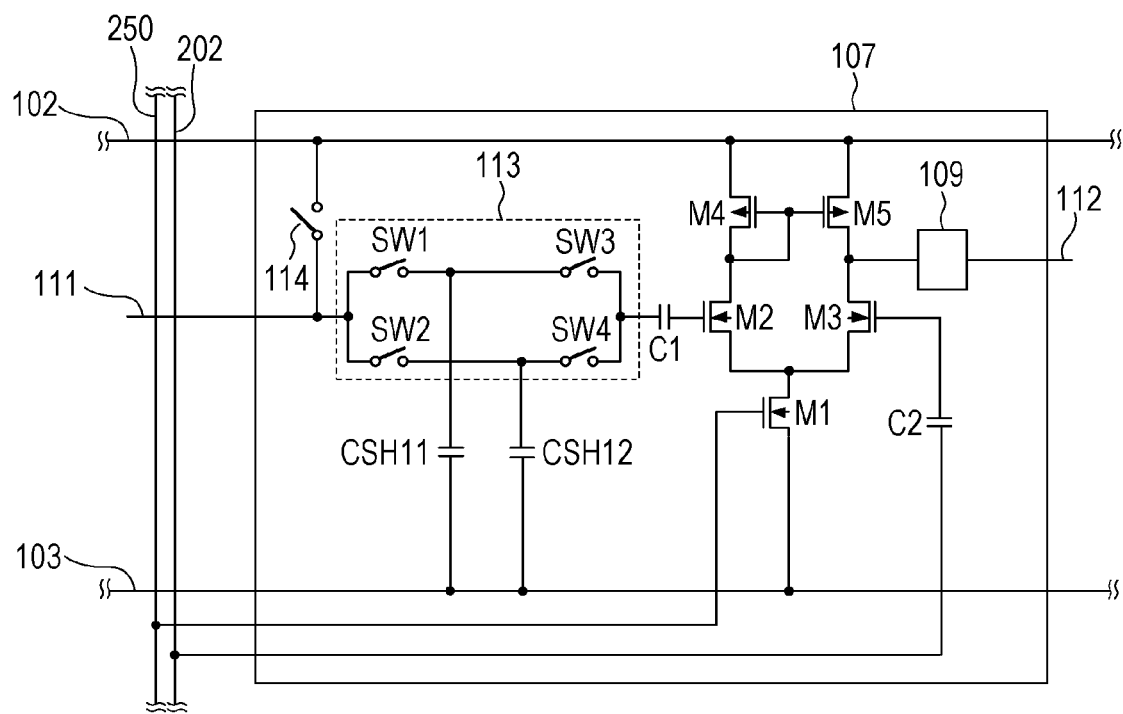
FIG. 8A illustrates another example of a configuration of a pixel output circuit.

FIG. 8A illustrates a configuration of the comparator unit 107 according to the present embodiment. A difference from FIG. 2A is that the comparator unit 107 in FIG. 8A includes a switch group 113 and capacitor elements CSH11 and CSH12. The switch group 113 includes switches SW1 to SW4. A signal output from the amplifier 120 is applied to the switches SW1 and SW2. When the switch SW1 turns into the conductive state, the capacitor element CSH11 holds the signal output from the amplifier 120. When the switch SW2 turns into the conductive state, the capacitor element CSH12 holds the signal output from the amplifier 120. When the switch SW3 turns into the conductive state, the signal held in the capacitor element CSH11 is input to an input node of a transistor M2 via a capacitor element C1. When the switch SW4 turns into the conductive state, the signal held in the capacitor element CSH12 is input to an input node of the transistor M2 via the capacitor element C1. The signals held in the capacitor elements CSH11 and CSH12 are reset when the switch 114 and SW1 to SW4 are turned into the conductive state.

FIG. 8B is a timing chart associated with an operation of taking a still image by an image pickup apparatus including the comparator unit 107 illustrated in FIG. 8A. In the present embodiment, the gain period, the ADC period, and the read period are set to have the same length.

After the end of the Pix period for the pixel output circuits in the K-th to (K+3)th rows, the amplifier 120 amplifies the photoelectric conversion signal of the pixel output circuit 101 in the K-th row and outputs the resultant amplified signal to the comparator unit 107. In the gain period, the switch SW1 in the switch group 113 is turned into the conductive state, and the capacitor element CSH11 holds the signal output from the amplifier 120. In the ADC period for the pixel output circuit 101 in the K-th row, the switch SW1 turns into the non-conductive state, and the switch SW3 turns into the conductive state. In the timing diagram illustrated in FIG. 8B, the vertical control circuit 400 performs the operation associated with the ADC period for pixel output circuits 101 in the K-th row and the gain period for pixel output circuits 101 in the (K+1)th row such that these periods overlap each other. In the gain period for the pixel output circuit 101 in the (K+1)th row, the switch SW2 in the switch group 113 turns into the conductive state, and the capacitor element CSH12 holds the signal output from the amplifier 120. In the ADC period for the pixel output circuit 101 in the (K+1)th row, the switch SW2 turns into the non-conductive state and the switch SW4 turns into the conductive state.

Similarly, thereafter, the image pickup apparatus in the present embodiment operates such that the gain period for pixel output circuits 101 in a certain row and the ADC period for pixel output circuits 101 in another row overlap each other. This makes it possible to generate a digital signal based on photoelectric conversion signals of the respective pixel output circuits 101 in a short period compared with the case win which there is no overlap at all between the gain period and the ADC period.

FIG. 8C illustrates a case in which a gain period has a length equal to the sum of the length of an ADC period and the length of a read period. In this case, the gain period according to the present embodiment is an example of a first period, and the gain period according to the present embodiment, and the ADC period according to the present embodiment is an example of a second period. Furthermore, in this case, the vertical control circuit 400 performs the operation such that the gain period for a certain row overlaps the ADC period and the read period for another row. This makes it possible to generate a digital signal based on photoelectric conversion signals of the respective pixel output circuits 101 in a short period compared with the case win which there the gain period does not overlap the ADC period and the read period at all.

Fifth Example Embodiment

An image pickup apparatus according to a fifth example embodiment is described below with a focus on differences from the fourth embodiment. In the present embodiment, amplifiers 120-1 and 120-2 are used as examples of first circuits, and a comparator unit 107 is used as an example of a second circuit.

In the image pickup apparatus according to the present embodiment, two pixel output circuits 101 share one amplifier 120, and four pixel output circuits 101 share one comparator unit 107.

Figure 9A:
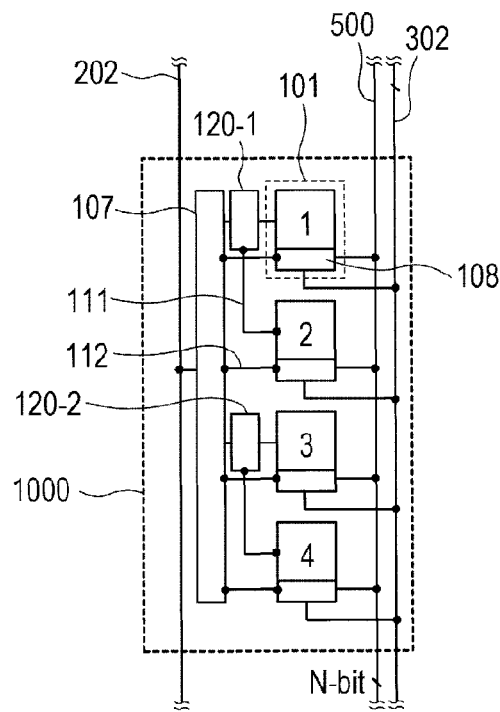
FIG. 9A illustrates another example of a configuration of a pixel output circuit.

FIG. 9A illustrates a configuration of the image pickup apparatus according to the present embodiment. Pixel output circuits 101 in the K-th and (K+1) rows share one amplifier 120-1, and pixel output circuits 101 in the (K+3)th and (K+4)th rows share another amplifier 120-2. The amplifiers 120-1 and 120-2 each amplify photoelectric conversion signals output from the corresponding pixel output circuits 101 and output the resultant signals to the comparator unit 107. In the present embodiment, the unit cell 1000 includes one comparator unit 107, two amplifiers 120-1 and 120-2, and four pixel output circuits 101 sharing the two amplifiers 120-1 and 120-2.

Figure 9B:
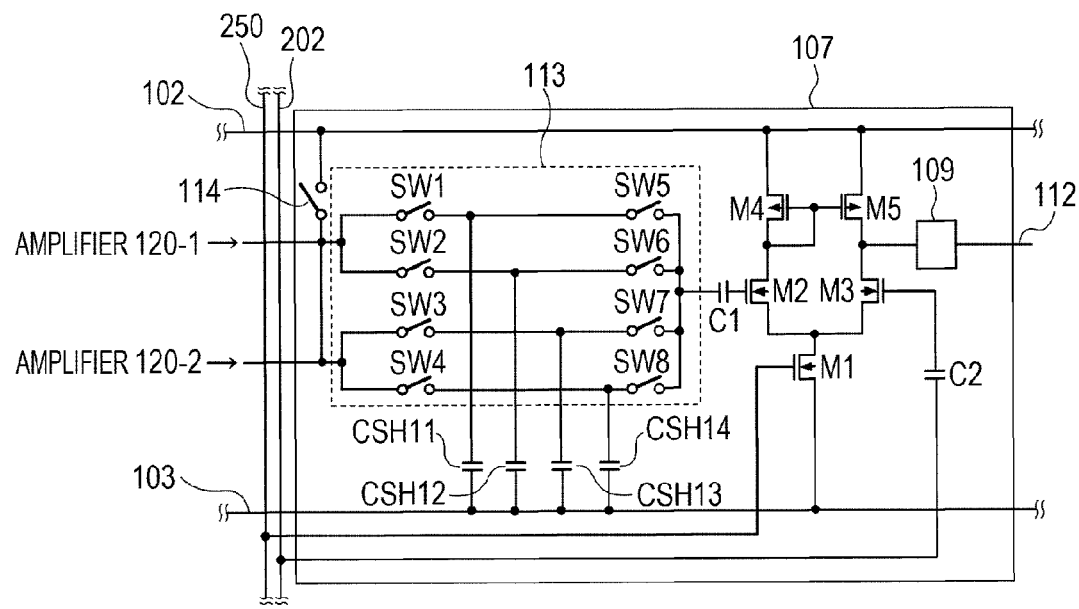
FIG. 9B illustrates another example of a configuration of a comparator unit.

FIG. 9B illustrates a configuration of the comparator unit 107 of the image pickup apparatus illustrated in FIG. 9A. A switch group 113 includes switches SW1 to SW 8. The comparator unit 107 includes capacitor elements CSH11 to CSH14. A signal output from the amplifier 120-1 is input to the output switches SW1 and SW2. When the switch SW1 is in an on-state under the control of a non-illustrated control unit, the capacitor element CSH11 holds the signal output from the amplifier 120-1. On the other hand, when the switch SW2 is in an on-state under the control of the non-illustrated control unit, the capacitor element CSH12 holds the signal output from the amplifier 120-1. Similarly, when the switch SW3 is turned into the conductive state by the non-illustrated control unit, the capacitor element CSH13 holds the signal output from the amplifier 120-2, and when the switch SW4 is turned into the conductive state by the non-illustrated control unit, the capacitor element CSH14 holds the signal output from the amplifier 120-2. The signals held in the capacitor elements CSH11 to CSH14 are reset when the switch 114 and SW1 to SW8 are turned into the conductive state.

When the non-illustrated control unit turns the switch SW1 into the non-conductive state and turns the switch SW5 into the conductive state, the signal held in the capacitor element CSH11 is input to an input node of a transistor M2 via the switch SW5 and a capacitor element C1. As for the other capacitor elements CSH12 to CSH14, when one of switches SW2 to SW4 corresponding to each one of capacitor elements CSH12 to CSH14 is turned into the non-conductive state, and one of switches SW6 to SW8 corresponding to this one of capacitor elements CSH12 to CSH14 is turned into the conductive state, the signal held in this one of capacitor elements CSH12 to CSH14 is output therefrom to the transistor M2 via the capacitor element C1.

Figure 9C:
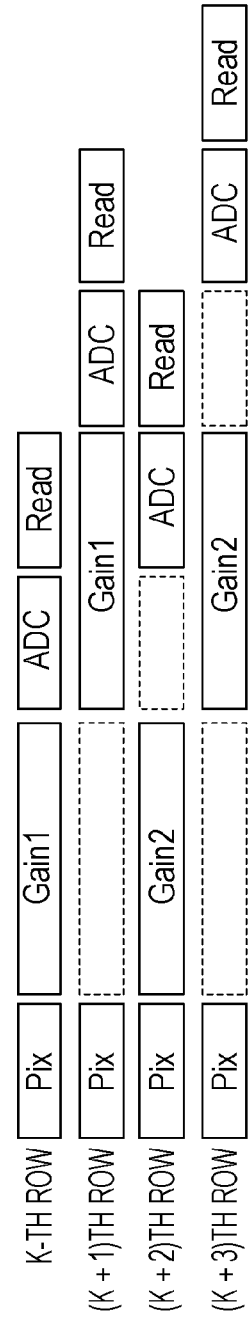
FIG. 9C is a diagram illustrating another example of an operation of a pixel output circuit and a comparator unit.

FIG. 9C illustrates an operation of the image pickup apparatus shown in FIG. 9A. In FIG. 9C, Gain1 denotes an amplification operation by the amplifier 120-1. Similarly, Gain2 denotes an amplification operation by the amplifier 120-2. The photoelectric conversion signals output from the pixel output circuit 101 in the K-th row and the pixel output circuit 101 in the (K+2)th row are respectively input to the amplifier 120-1 and the amplifier 120-2 at the same time. The amplifier 120-1 amplifies the photoelectric conversion signal of the pixel output circuit 101 in the K-th row and outputs the resultant amplified signal to the capacitor element CSH11 via the switch SW1. The amplifier 120-2 amplifies the photoelectric conversion signal of the pixel output circuit 101 in the (K+2)th row and outputs the resultant amplified signal to the capacitor element CSH13 via the switch SW3. The start and the end of the gain period for the amplifier 120-1 are respectively the same in timing as the start and the end of the gain period for the amplifier 120-2.

In the analog-to-digital conversion associated with the pixel output circuit 101 in the K-th row, the vertical control circuit 400 turns the switches SW1 and SW3 into the no-conductive state and turns the switch SW5 into the conductive state. In response, the comparator unit 107 starts the ADC period for the pixel output circuit 101 in the K-th row. The amplifier 120-1 amplifies the photoelectric conversion signal of the pixel output circuit 101 in the (K+1)th row and outputs the resultant amplified signal to the capacitor element CSH12 via the switch SW2. The amplifier 120-2 amplifies the photoelectric conversion signal of the pixel output circuit 101 in the (K+3)th row and outputs the resultant amplified signal to the capacitor element CSH14 via the switch SW4.

When the end of the ADC period for the pixel output circuit 101 in the K-th row is reached, the vertical control circuit 400 turns the switch SW5 into the non-conductive state and turns the SW7 into the non-conductive state. In response, the ADC period for the pixel output circuit 101 in the (K+2)th row is started.

In the image pickup apparatus according to the present embodiment, gain periods associated with a plurality of pixel output circuits 101 are allowed to overlap with each other. On the other hand, in the image pickup apparatus according to the fourth example embodiment described above, after the gain period for the pixel output circuit 101 in a certain row is ended, the gain period for the pixel output circuit 101 in another row is started. That is, in the image pickup apparatus according to the present embodiment, it is possible to reduce the period in which the photoelectric conversion signals of the plurality of pixel output circuits 101 are amplified, compared with the period of the image pickup apparatus according to the fourth example embodiment.

In a first step in the timing-related operation for the still image illustrated in FIG. 9C, the amplifier 120-1 amplifies the photoelectric conversion signal of the pixel output circuit 101 in the K-th row. In a second step, the comparator unit 107 compares the amplified photoelectric conversion signal of the pixel output circuit 101 in the K-th row output from the amplifier 120-1 with the ramp signal. In a third step, the amplifier 120-1 amplifies the photoelectric conversion signal of the pixel output circuit 101 in the (K+1)th row. In this timing-related operation for the still image, there is at least a partial overlap between a period of the second step and a period of the third step.

A first period described in the claims corresponds to the gain period according to the present embodiment. A second period described in the claims corresponds to the ADC period according to the present embodiment. In the image pickup apparatus according to the present embodiment, as illustrated in FIG. 9C, the length of the gain period given as the first period is longer than the length of the ADC period given as the second period. This makes it possible to provide the amplifiers 120 and the comparator units 107 such that there are more amplifiers 120 than there are comparator units 107 and such that a plurality of amplifiers 120 operate in parallel. That is, in the image pickup apparatus according to the present embodiment, the number of pixel output circuits 101 sharing a circuit unit with a long operation period is set to be smaller than the number of pixel output circuits sharing a circuit unit with a short operation period. Thus, the reduction in the number of amplifiers 120 and comparator units 107 allows a reduction in power consumption and a reduction in circuit area size while suppressing an increase in operation period compared with the configuration in which each pixel output circuit 101 has its own amplifier 120 and comparator unit 107.

Furthermore, in the image pickup apparatus according to the present embodiment, the comparator unit 107 includes capacitor elements CSH11 to CSH14 and the switch group 113 including switches SW1 to SW8. Therefore, in the plurality of pixel output circuits 101 that sequentially output the photoelectric conversion signals to the same amplifier 120, the ADC period for the signal based on the photoelectric conversion signal of one pixel output circuit 101 is allowed to overlap the gain period for the photoelectric conversion signal of another pixel output circuit 101.

Sixth Example Embodiment

An image pickup apparatus according to a sixth example embodiment is described below with a focus on differences from the fourth example embodiment. In the present embodiment, comparator units 107-1 and 107-2 are used as a first circuit, and an amplifier 120 is used as a second circuit.

Figure 10A:
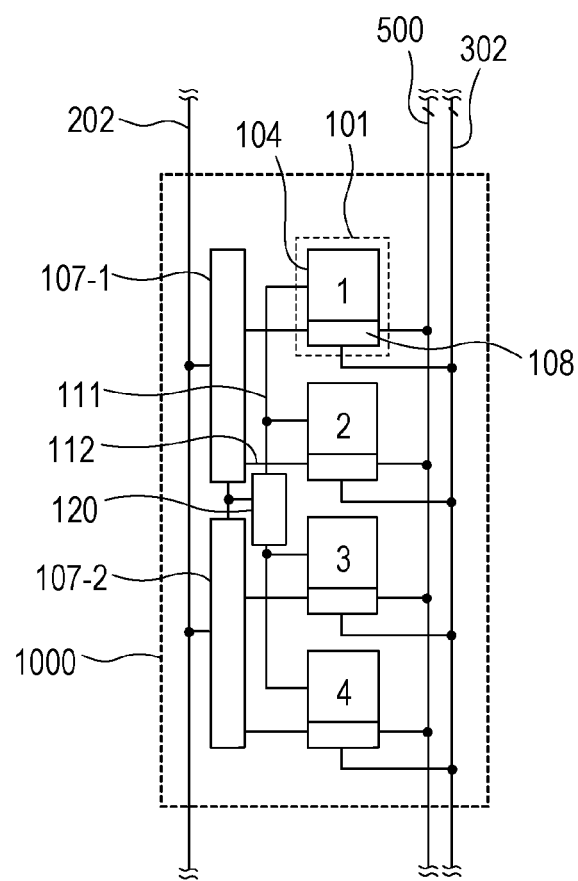
FIG. 10A illustrates another example of a configuration of a pixel output circuit.

FIG. 10A illustrates a configuration of the image pickup apparatus according to the present embodiment. In the image pickup apparatus according to the present embodiment, one amplifier 120 is shared by four pixel output circuits 101. Furthermore, in the image pickup apparatus according to the present embodiment, two comparator units 107-1 and 107-2 are provided for one amplifier 120. Photoelectric conversion signals output from the respective pixel output circuits 101 in the K-th row and the (K+1)th row are amplified by the amplifier 120 and input to the comparator unit 107-1. Photoelectric conversion signals output from the respective pixel output circuits 101 in the (K+2)th row and the (K+3)th row are amplified by the amplifier 120 and input to the comparator unit 107-2. In the present embodiment, the unit cell 1000 includes two comparator units 107-1 and 107-2, one amplifier 120, and four pixel output circuits 101 sharing the one amplifier 120.

In the present embodiment, the configuration of each of the comparator units 107-1 and 107-2 may be the same as that of the comparator unit 107 according to the fourth example embodiment.

Figure 10B:
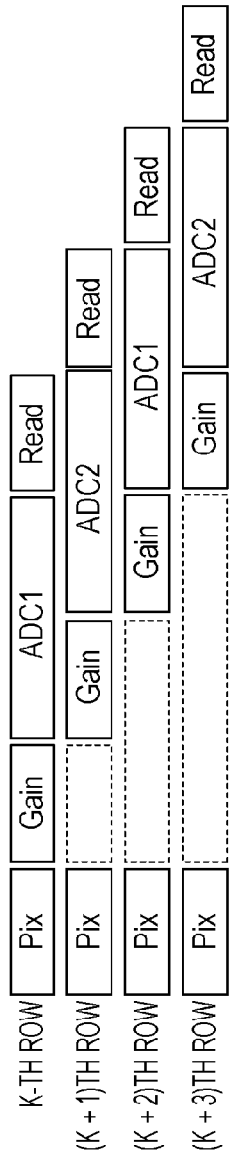
FIG. 10B is a diagram illustrating another example of an operation of a pixel output circuit and a comparator unit.

FIG. 10B illustrates an operation of the image pickup apparatus according to the present embodiment. In FIG. 10B, ADC1 denotes an analog-to-digital conversion operation associated with the comparator unit 107-1, and ADC2 denotes an analog-to-digital conversion operation associated with the comparator unit 107-2.

As illustrated in FIG. 10B, when an amplified signal of a photoelectric conversion signal of a pixel output circuit 101 in a certain row is processed in an ADC period, a photoelectric conversion signal of a pixel output circuit 101 in another row is amplified by the amplifier 120. A part of an ADC period for a pixel output circuit 101 in a certain row may overlap with a part of an ADC period for a pixel output circuit 101 in another row. That is, in the image pickup apparatus according to the present embodiment, it is allowed to perform ADC periods in parallel for a plurality of pixel output circuits 101. This makes it possible to reduce the period in which a digital signal is generated based on photoelectric conversion signals of respective ones of the plurality of pixel output circuits 101, compared with the image pickup apparatus according to the fourth example embodiment.

In a first step in the timing-related operation for the still image illustrated in the figure associated with the operation timing in FIG. 10B, the comparator unit 107-1 compares the photoelectric conversion signal of the pixel output circuit 101 in the K-th row with the ramp signal. In a second step, the amplifier 120 amplifies the photoelectric conversion signal of the pixel output circuit 101 in the (K+2)th row. In a third step, the comparator unit 107-2 compares the amplified photoelectric conversion signal of the pixel output circuit 101 in the (K+1)th row with the ramp signal. In this timing-related operation for the still image, there is an overlap between at least part of the second-step period and at least part of the third-step period.

A first period described in the claims corresponds to the gain period according to the present embodiment. A second period described in the claims corresponds to the ADC period according to the present embodiment. In the image pickup apparatus according to the present embodiment, as illustrated in FIG. 10B, the length of the gain period given as the first period is shorter than the length of the ADC period given as the second period. Therefore, a larger number of comparator units 107 are provided than there are amplifiers 120 such that a plurality of comparator units 107 are allowed to operate in parallel. That is, in the image pickup apparatus according to the present embodiment, the number of pixel output circuits 101 sharing a circuit unit with a long operation period is set to be smaller than the number of pixel output circuits sharing a circuit unit with a short operation period. Thus, the reduction in the number of amplifiers 120 and comparator units 107 allows a reduction in power consumption and a reduction in circuit area size while suppressing an increase in operation period compared with the configuration in which each pixel output circuit 101 has its own amplifier 120 and comparator unit 107.

Seventh Example Embodiment

An image pickup apparatus according to a seventh example embodiment is described below with a focus on differences from the fifth example embodiment.

Figure 10C:
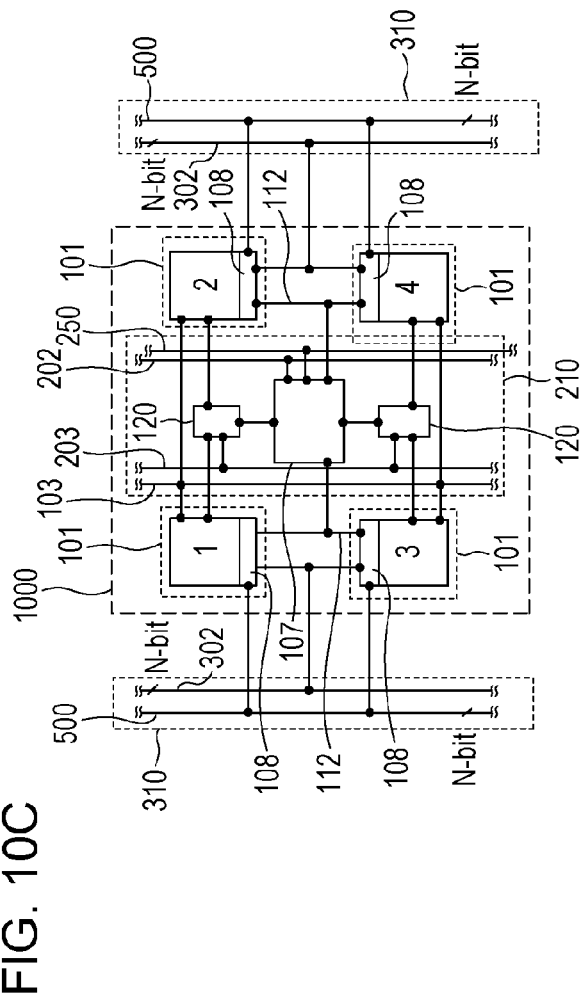
FIG. 10C is a diagram illustrating another example of a configuration of a pixel output circuit.

FIG. 10C illustrates an example of a configuration of an image pickup apparatus according to the seventh example embodiment. In the image pickup apparatus according to the present embodiment, four pixel output circuits 101 arranged in an array with 2 rows and 2 columns share two amplifiers 120 and one comparator unit 107.

The configuration in which the four pixel output circuits 101 arranged in the array with 2 rows and 2 columns share the two amplifiers 120 and the one comparator unit 107 has advantageous effects as described below. Each of a vertical output line 500 and a count signal line 302 is actually a set of N lines to transmit an N-bit parallel digital signal. Hereinafter, such a set of signal lines for transmitting digital signals such as set of vertical output lines 500, a set of count signal lines 302, or the like will be referred to generically as a digital signal line group 310. On the other hand, a bias line 103, a bias line 250, a ramp signal line 202, and a bias line 203 for supplying a driving bias to the amplifier 120 may each be in a single line. Hereinafter, lines for supplying an electric potential, such as bias lines 103, 203, and 250, a ramp signal line 202, or the like will be referred to generically as an analog signal line group 210. Although a bias line 102 is not illustrated in FIG. 10C, the bias line 102 is provided so as to extend parallel to the bias line 103 in an area in which the analog signal line group 210 is provided.

The digital signal line group 310 tends to include a larger number of lines than the analog signal line group 210. Therefore, the digital signal line group 310 corresponding to pixel output circuits 101 in two columns tends to have a greater width than the width of the analog signal line group 210 corresponding to the pixel output circuits 101 in two columns. On the other hand, from the point of view of optical characteristics, it may be advantageous that the column-to-column distance of the pixel output circuits 101 is constant. Therefore, in designing of the image pickup apparatus, a restriction may occur due to a difference between the width of the digital signal line group 310 for the pixel output circuits 101 in two columns and the width of the analog signal line group 210 for the pixel output circuits 101 in the two columns.

In the image pickup apparatus illustrated in FIG. 10C, the amplifier 120 and the comparator unit 107 are disposed in an area of the analog signal line group 210 whose width is smaller than the width of the digital signal line group 310. That is, the analog signal line group 210 is disposed between conversion units. On the other hand, the digital signal line group 310 is disposed between unit cells. This results in a reduction in difference between the width of the digital signal line group 310 and the total width of the analog signal line group 210 including the amplifier 120 and the comparator unit 107, which makes it easy to dispose pixel output circuits 101 with equal column-to-column spaces therebetween.

Furthermore, in the image pickup apparatus illustrated in FIG. 10C, memories 108 are disposed such that they face each other between those located in pixel output circuits 101 in adjacent rows. Compared with a configuration in which pixel output circuits 101 in adjacent rows are equal in layout, it is possible to reduce the line length of a latch signal line 112 electrically connecting the comparator unit 107 to the memories 108 of the respective pixel output circuits 101 in two rows. Furthermore, it is also allowed to reduce an electrical path between a count signal line 302 and the memories 108 of the respective pixel output circuits 101 in two rows. Thus, the image pickup apparatus illustrated in FIG. 10C has an advantageous effect that it is possible to reduce the circuit area size of the pixel output circuits 101 in two rows compared with the circuit area size in the case where the pixel output circuits 101 in adjacent rows are equal in layout.

Eighth Example Embodiment

FIG. 11 illustrates an image pickup system including the image pickup apparatus according to one of the first to seventh example embodiments.

In FIG. 11, the image pickup system includes a lens protection barrier 151, a lens 152 for forming an optical image of an object on an image pickup apparatus 154, and an aperture 153 for varying the light quantity passing through the lens 152. The image pickup system further includes an output signal processing unit 155 configured to process a signal output from the image pickup apparatus 154. The signal output from the image pickup apparatus 154 is an image signal based on which to generate an image of an object. The output signal processing unit 155 may perform various kinds of processes including a correction process, a compression process, and the like, on the image signal output from the image pickup apparatus 154 thereby generating an image. The lens 152 and the aperture 153 form an optical system that focus light onto the image pickup apparatus 154.

The image pickup system illustrated by way of example in FIG. 11 further includes a buffer memory unit 156 for temporarily storing image data, and an external apparatus interface 157 for communicating with an external computer or the like. The image pickup system further includes a removable storage medium 159 such as a semiconductor memory for storing or reading image data, and a storage medium control interface unit 158 configured to store or read the image data in or from the storage medium 159. The image pickup system further includes a general control/operation unit 1510 configured to perform various calculations and operations and perform overall control of the digital still camera.

The image pickup apparatus 154 included in the image pickup system illustrated in FIG. 11 may be configured according to one of first to seven example embodiments described above. Thus, the image pickup apparatus 154 in the image pickup system illustrated in FIG. 11 also provides advantageous effects similar to those obtained by the first to seventh example embodiments.

According to the embodiments described above, it is possible to reduce the number of at least either first circuits or second circuits, which allows a reduction in power consumption and a reduction in circuit area size while suppressing an increase in period from a time at which electric signals are output from a plurality of conversion units to a time at which digital signals are obtained based on the electric signals of the plurality of conversion units, compared to those obtained in a configuration in which each of a plurality of conversion units has its own first circuit and second circuit.

While the present subject matter has been described with reference to exemplary embodiments, it is to be understood that the subject matter claimed herein is not limited to the disclosed exemplary embodiments. The scope of the following claims is to be accorded the broadest interpretation so as to encompass all such modifications and equivalent structures and functions.

This application claims the benefit of Japanese Patent Application No. 2013-091426 filed Apr. 24, 2013, which is hereby incorporated by reference herein in its entirety.

What is claimed is:

1. An image pickup apparatus comprising:
a pixel array comprising a plurality of unit cells arranged in matrix,
one of the plurality of unit cells outputting a digital signal based on an electric signal, and the one of the plurality of unit cells comprising
a plurality of photoelectric conversion units each configured to output the electric signal generated by accumulating the electric signal in a period based on electromagnetic waves incident on respective ones of the plurality of photoelectric conversion units, and
a first circuit provided downstream of a photoelectric conversion unit among the plurality of photoelectric conversion units, and a second circuit,
wherein the first circuit is configured to process the electric signal output from the photoelectric conversion unit after the period, the second circuit is configured to process a signal processed by the first circuit,
wherein an operation period of the second circuit is shorter than an operation period of the first circuit, and
wherein a number of the first circuit arranged in the one of the plurality of unit cells is greater than a number of the second circuit arranged in the one of the plurality of unit cells,
wherein the image pickup apparatus further comprises a third circuit configured to process a signal processed by the second circuit,
wherein the second circuit is an amplifier configured to amplify the electric signal, and
wherein the third circuit is a signal processing unit configured to process the electric signal output by the amplifier.

2. The image pickup apparatus according to claim 1,
wherein the signal processing unit is a comparator unit configured to compare the electric signal with a reference signal having an electric potential varying with time,
wherein the comparator unit generates a comparison result signal indicating a result of the comparison,
wherein the digital signal is a signal based on a count signal generated by counting a clock signal based on a moment when a change occurs in a signal value of the comparison result signal, and
wherein the operation period of the second circuit is an operation period of the comparator unit, and the operation period of the comparator unit is a period from a start of a change in the electric potential of the reference signal applied to the comparator unit to an end of the change in the electric potential of the reference signal applied to the comparator unit.

3. The image pickup apparatus according to claim 2,
wherein the electric signal input to the comparator unit has an amplitude of an input range equal to VR, and the digital signal has a bit length of N bits, and
wherein the operation period of the first circuit is an operation period of the amplifier is a period from a time at which outputting of the electric signal to the amplifier is started to a time at which a difference DIF between an output value of the amplifier and an ideal output value of the amplifier calculated using a gain set for the amplifier satisfies a condition represented by the equation $$|DIF| \leq \left|\frac{VR}{2^N}\right|.$$

4. The image pickup apparatus according to claim 2,
wherein the digital signal is a signal based on a count signal generated by counting a clock signal based on a moment when a change occurs in a signal value of the comparison result signal, and
wherein the operation period of the first circuit is an operation period of the amplifier is a period from a time at which the electric signal is applied to the amplifier to a time at which changing the electric potential of the reference signal applied to the comparator unit is started.

5. The image pickup apparatus according to claim 2,
wherein the signal processing unit further includes a memory configured to hold the count signal.

6. An image pickup apparatus comprising:
a pixel array comprising a plurality of unit cells arranged in matrix,
one of the plurality of unit cells outputting a digital signal based on an electric signal, and the one of the plurality of unit cells comprising
a plurality of photoelectric conversion units each configured to output the electric signal generated by accumulating the electric signal in a period based on electromagnetic waves incident on respective ones of the plurality of photoelectric conversion units, and
a first circuit provided downstream of a photoelectric conversion unit among the plurality of photoelectric conversion units, and a second circuit,
wherein the first circuit is configured to process the electric signal output from the photoelectric conversion unit after the period, the second circuit is configured to process a signal processed by the first circuit,
wherein an operation period of the second circuit is shorter than an operation period of the first circuit, and
wherein a number of the first circuit arranged in the one of the plurality of unit cells is greater than a number of the second circuit arranged in the one of the plurality of unit cells,
wherein the first circuit is a signal holding unit configured to hold the electric signal, and
wherein the second circuit is a signal processing unit configured to process the electric signal held in the signal holding unit,
wherein the image pickup apparatus further comprises:
a bias line configured to supply an electric potential to the photoelectric conversion unit and the signal processing unit; and
an output line to which the digital signals are sequentially output from the plurality of unit cells,
wherein the bias line is disposed between photoelectric conversion units in the plurality of photoelectric conversion units included in the unit cell, and
wherein the output line is disposed between the unit cells.

7. The image pickup apparatus according to claim 6,
wherein the signal processing unit is a comparator unit configured to compare the electric signal with a reference signal having an electric potential varying with time, wherein the comparator unit generates a comparison result signal indicating a result of the comparison, and wherein the digital signal is a signal based on a count signal generated by counting a clock signal based on a moment when a change occurs in a signal value of the comparison result signal.

8. The image pickup apparatus according to claim 7, further comprising a third circuit configured to process a signal processed by the second circuit, wherein the third circuit is a memory configured to hold the digital signal output from the signal processing unit.

9. The image pickup apparatus according to claim 6, further comprising:

a plurality of second signal holding units in an electrical path between the plurality of photoelectric conversion units and the signal processing unit, wherein a first one of the plurality of second signal holding units holds a signal based on the electric signal of a first one of the plurality of photoelectric conversion units, and wherein a second one of the plurality of second signal holding units holds a signal based on the electric signal of a second one of the plurality of photoelectric conversion units different from the first one of the plurality of photoelectric conversion units.

10. The image pickup apparatus according to claim 6, wherein the plurality of photoelectric conversion units included in each unit cell are photoelectric conversion units arranged in the form of an array with two rows and two columns, and wherein the signal processing unit is disposed between rows and between columns of the array.

11. An image pickup system comprising:

an image pickup apparatus; and an output signal processing unit connected to the image pickup apparatus, and configured to generate an image by processing a signal output from the image pickup apparatus, wherein the image pickup apparatus comprises:

a pixel array comprising a plurality of unit cells arranged in matrix, one of the plurality of unit cells outputting a digital signal based on an electric signal, and the one of the plurality of unit cells comprising:

a plurality of photoelectric conversion units configured to output the electric signal generated by accumulating the electric signal in a period based on electromagnetic waves incident on respective ones of the plurality of photoelectric conversion units, and a first circuit provided downstream of a photoelectric conversion unit among the plurality of photoelectric conversion units, and a second circuit, wherein the first circuit is configured to process the electric signal provided downstream of the photoelectric conversion unit, and the second circuit is configured to process a signal processed by the first circuit, wherein an operation period of the second circuit is shorter than an operation period of the first circuit, and wherein a number of the first circuit arranged in the one of the plurality of unit cells is greater than a number of the second circuit arranged in the one of the plurality of unit cells, wherein the image pickup apparatus further comprises a third circuit configured to process a signal processed by the second circuit, wherein the second circuit is an amplifier configured to amplify the electric signal, and wherein the third circuit is a signal processing unit configured to process the electric signal output by the amplifier.

* * * * *